United States Patent
Rowe et al.

(10) Patent No.: US 6,466,941 B1
(45) Date of Patent: Oct. 15, 2002

(54) CONTENT MANAGEMENT TOOL AND SERVICE TABLE DATABASE WITH UNIQUE SERVICE ENTRIES EACH ASSOCIATED WITH A SET OF RECORD TABLES WITH RECORD ENTRIES INCLUDING LINKS TO SHARED RECORD ENTRIES IN OTHER TABLES

(75) Inventors: Stuart Rowe, Bucks; Michael John Webb; Sandip Sarda, both of London, all of (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/043,109

(22) PCT Filed: Mar. 5, 1998

(86) PCT No.: PCT/GB98/00722

§ 371 (c)(1),
(2), (4) Date: Apr. 21, 1998

(87) PCT Pub. No.: WO98/41934

PCT Pub. Date: Sep. 24, 1998

(30) Foreign Application Priority Data

Mar. 17, 1997 (GB) .............................................. 9705469

(51) Int. Cl.[7] .............................................. G06F 17/30
(52) U.S. Cl. .............................. 707/102; 707/2; 707/3; 707/10
(58) Field of Search ................................. 707/103, 2, 3, 707/100, 102, 101, 104, 10; 711/129, 153, 173, 206

(56) References Cited

U.S. PATENT DOCUMENTS

| | | | | |
|---|---|---|---|---|
| 4,274,139 A | * | 6/1981 | Hodgkinson et al. ....... | 709/203 |
| 4,432,057 A | * | 2/1984 | Daniell et al. | |
| 4,558,413 A | * | 12/1985 | Schmidt et al. ............. | 707/203 |
| 4,604,686 A | * | 8/1986 | Reiter et al. ................ | 395/500 |
| 4,714,992 A | * | 12/1987 | Gladney et al. ............ | 707/206 |
| 4,714,995 A | * | 12/1987 | Materna et al. ............. | 707/201 |
| 4,815,030 A | * | 3/1989 | Cross et al. .................. | 707/10 |
| 4,974,149 A | * | 11/1990 | Valenti ....................... | 709/217 |
| 5,689,708 A | * | 11/1997 | Regnier et al. ............. | 709/229 |
| 5,706,434 A | * | 1/1998 | Kremen et al. ............. | 709/218 |
| 5,710,918 A | * | 1/1998 | Lagarde et al. ............. | 707/10 |
| 5,721,911 A | * | 2/1998 | Ha et al. ..................... | 707/100 |
| 5,822,750 A | * | 10/1998 | Jou et al. ....................... | 707/2 |
| 5,835,897 A | * | 11/1998 | Dang ............................ | 705/2 |
| 5,862,325 A | * | 1/1999 | Reed et al. ............ | 395/200.31 |

FOREIGN PATENT DOCUMENTS

| | | |
|---|---|---|
| DE | 19533546 C | 11/1996 |
| DE | 195 33 546 C1 | 3/1997 |

* cited by examiner

Primary Examiner—Jean M. Corrielus
(74) Attorney, Agent, or Firm—Nixon & Vanderhye P.C.

(57) ABSTRACT

A database and content management tool for such a database has a plurality of tables. A service table identifies services having records in the database. Each service has a number of data tables defining, for example, item types with direct links to items of the service in a further table. Item types are also linked to feature types held in another data table, the linking being performed by a linking record table. Feature details are held in a feature detail table linked directly to feature types. Items are linked to feature values by a further linking table. Various other tables are linked to items such as Supplier and Media by respective linking tables. The arrangement allows the creation of HTML pages and other kinds of display from the various features either directly accessed from the table or whose location (e.g., in external file servers) is held in hyper data tables. A content management tool enabling end-users to update records and create links between unique identifiers (items) and shared data (feature type, supplier, media for example) is provided.

45 Claims, 22 Drawing Sheets

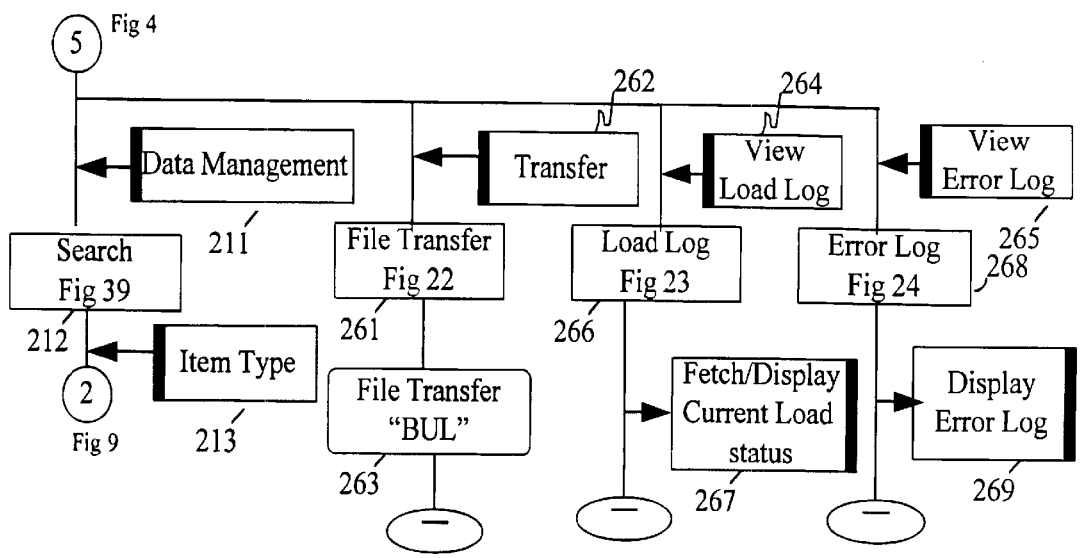
Fig 5
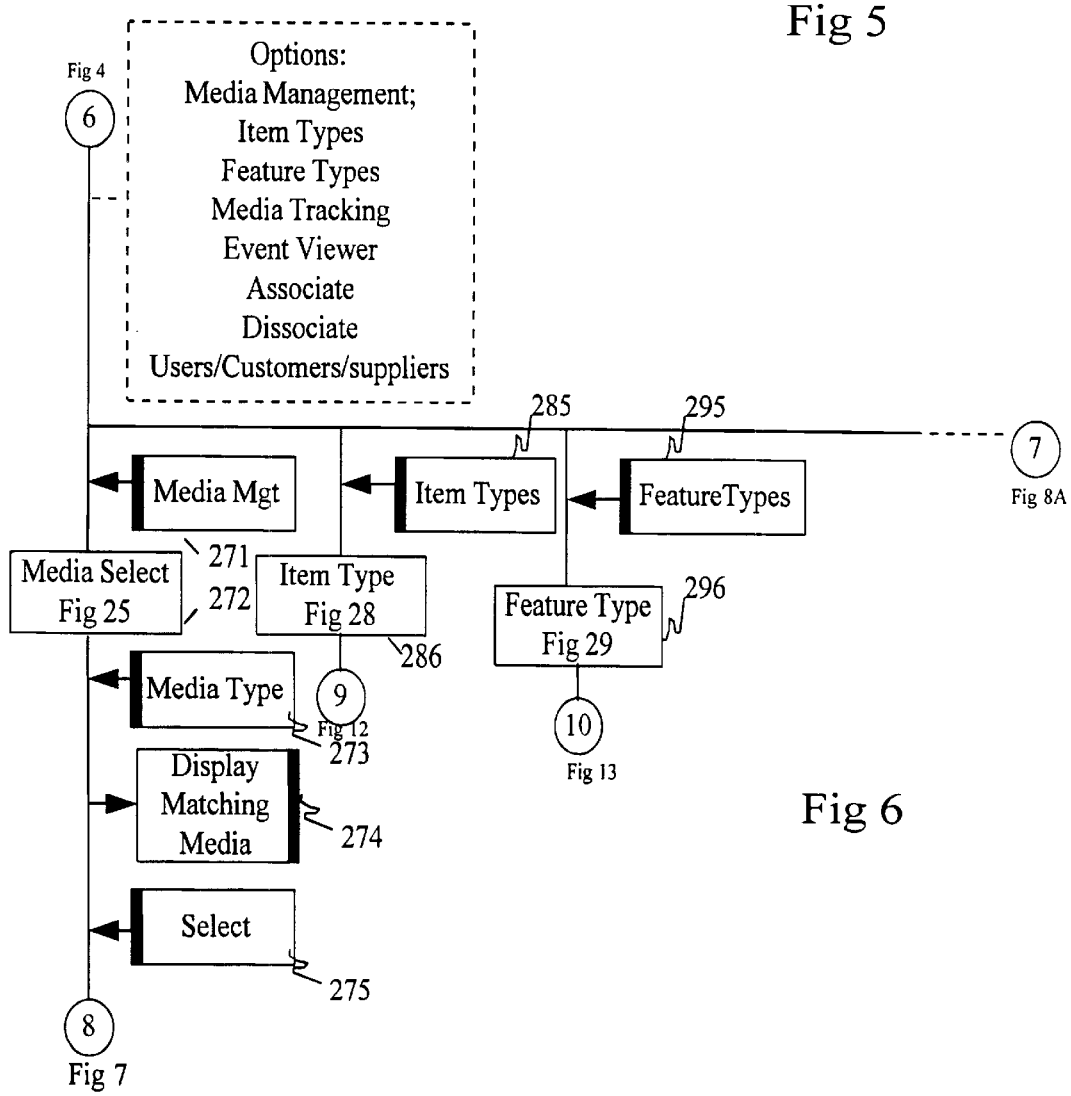
Fig 6
Fig 7

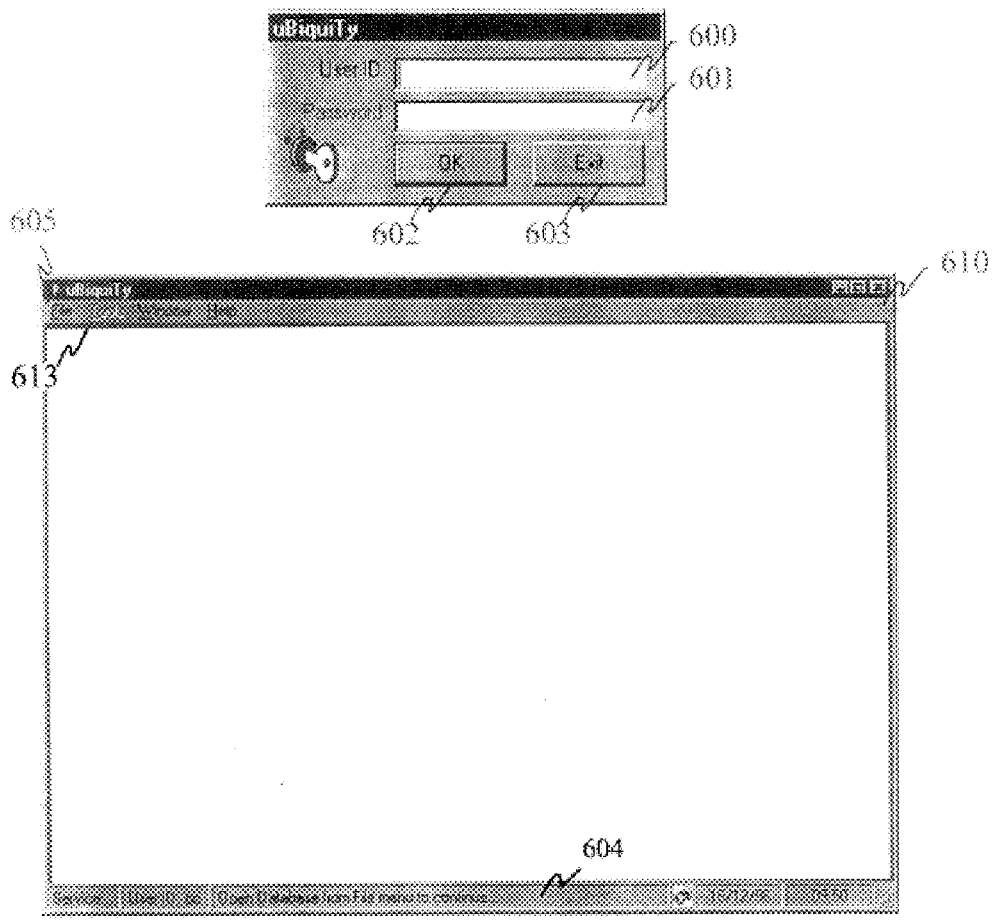
Fig 15
Fig 16
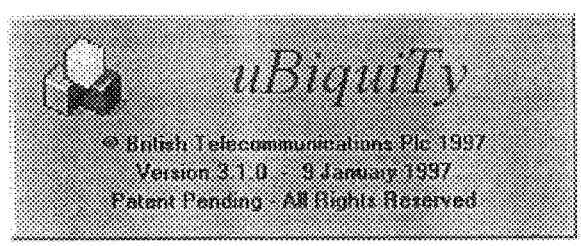
Fig 17
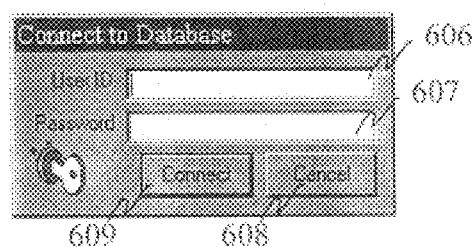
Fig 18

CONTENT MANAGEMENT TOOL AND SERVICE TABLE DATABASE WITH UNIQUE SERVICE ENTRIES EACH ASSOCIATED WITH A SET OF RECORD TABLES WITH RECORD ENTRIES INCLUDING LINKS TO SHARED RECORD ENTRIES IN OTHER TABLES

BACKGROUND OF THE INVENTION

1. Field of the Invention

The present invention relates to a re-usable database system and also to content management tools using such a database.

2. Related Art

Simple rapid access to information is a requirement not just of business organisations but also of the general public. As such developments as the so-called "Internet" or "World-Wide Web" (WWW) provide cheap access to information, sales and marketing promotions are accessible by personal computer users. Such users may browse information using keywords to identify products or services which they desire.

Consequently service providers produce "pages" of information for browsers to view, each such page comprising a number of features. Features may include, for example, text, pictures, graphics and "applets" which are programs downloaded to an end-user to provide moving features on the user's viewing screen. It has been usual to create each page individually and to store it as such in what is sometimes referred to as an HTML (hypertext mark-up language) format.

Large organisations such as retailing conglomerates, major manufacturers and the like may have a large number of such pages each being individually created and each requiring independent editing.

In addition to publicly accessible pages many organisations also have restricted access pages available to so-called closed-user groups. Such pages are accessed on request by members of the closed-user groups and can be browsed in the same way as "Internet" pages. The use of this kind of system is sometimes referred to as an "Intranet". Similarly, for Intranet use HTML pages may be individually created and edited.

Further, as well as Internet and Intranet access to information, so-called multimedia systems or interactive television access may be required. The information for these latter systems, while being based on the same kind of content (picture, text, moving picture, graphic and the like), may require different formatting and again may result in individual page files being held on a file server.

SUMMARY OF THE INVENTION

According to one aspect of the present invention there is provided a database comprising a hierarchical arrangement of data tables, said data tables including a service table and a plurality of record tables, said service table having a plurality of service entries each of which identifies a unique service, each service being associated with a respective set of record tables each of which has a data entry identifying its respective service, for each service at least one of the associated record tables including record entries which are linked to shared record entries in other record tables by linking entries in linking record tables.

Preferably at least one of the record tables includes shared record entries used by more than one of the other record tables.

Some entries in one of the record tables may have inks to shared records in at least two other record tables, each link comprising an entry in a respective linking record table. Some entries in a record table may be linked to other entries in the same record table by entries in another linking record table.

According to a second aspect of t he invention the database of the invention may be combined with a service centre connected to a data transport network, the service centre comprising means responsive to customer requests received through the network, to assemble from a plurality of record tables in respect of an accessed service a presentation comprising details drawn from more than one of the tables.

The service centre may assemble data for display using a template defining a plurality of areas of a screen, each area requiring a defined format sub-display, each sub-display being assembled from one or more record tables and or from media files located in one or more record tables.

According to a third aspect of the invention there is provided a content management tool in combination with a database of the kind claimed in any one of claims 1 to 13, the tool comprising a terminal attached to a data transport network and having access to the database through the network, the tool including means to allow authorised end-users of a service to create entries for each of a plurality of record tables and to create and/or delete links between records in a first of the tables and records in a second of the tables, said links being held as data entries in a linking record table such that records in the second table which may be useable by more than one record in a first table are available for linking.

Preferably the content management tool includes means to allow authorised end-users to enter data to cause up-dating of records in the second table such that entities referred to in said second table and which are common to entities in said first table require updating only once.

The content management tool may include means responsive to end-user action to create additional records in the second table, said additional records becoming available for linking to records in the first table. The tool may include means to display to an end-user a list of records from the first table, means responsive to end-user action selecting a record from the list to display a list of records from the second table which are linked to the selected first record and means responsive to user selection to delete links in the linking table to selected records in the second table. Means may be provided responsive to end-user action to select one or more of the records from said list and to create a linking record in the linking table between the record selected in the first table and the record(s) selected from the second table.

BRIEF DESCRIPTION OF EXEMPLARY EMBODIMENTS

A database system and content management tool in accordance with the invention will now be described by way of example only with reference to the accompanying drawings if which:

FIGS. 4–14 are schematic state transitions diagrams of the content management tool used to manipulate the data tables of FIG. 3; and FIGS. 15–41 are representative window displays on terminals of FIG. 1.

Figure 1:
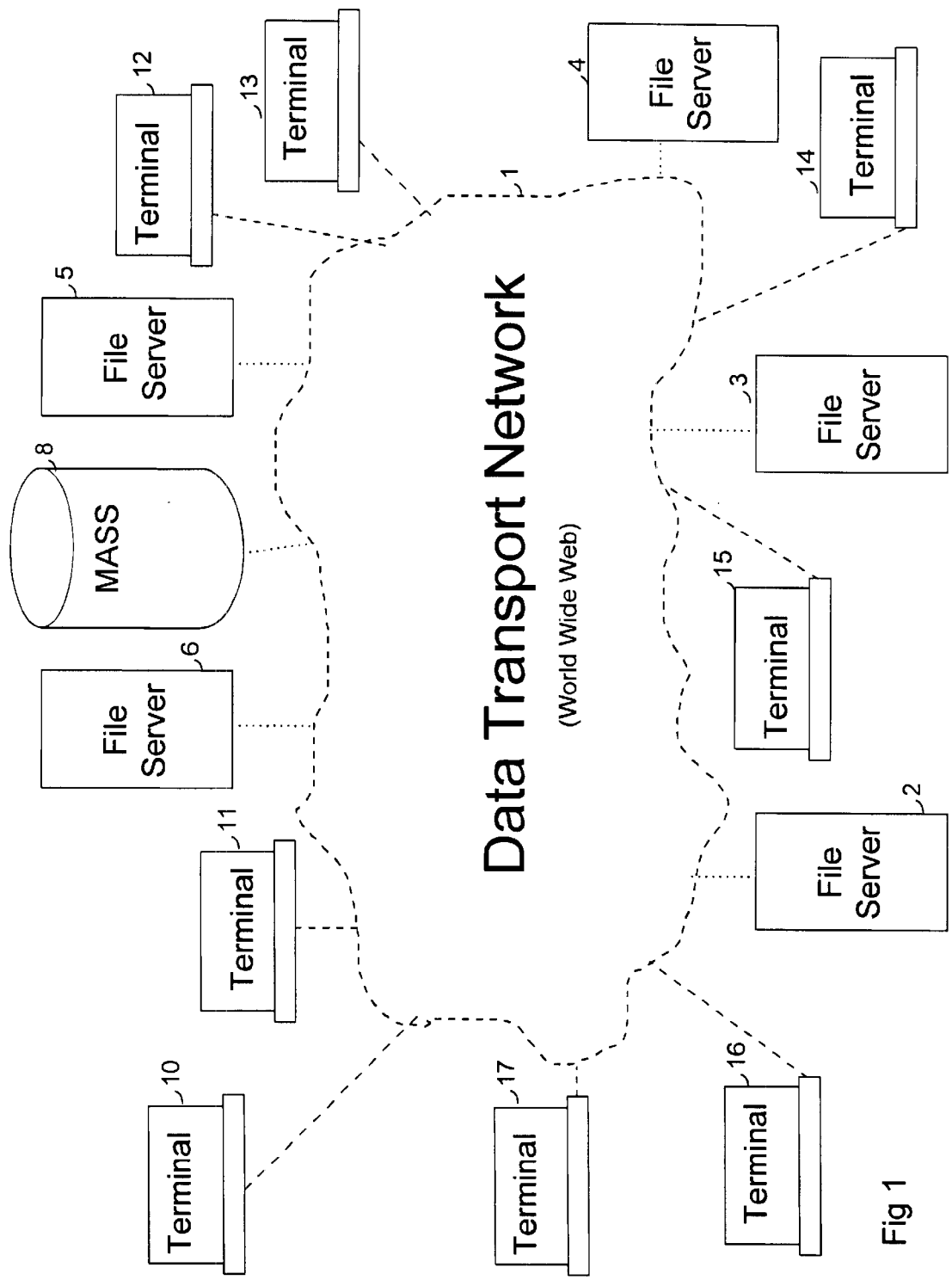
FIG. 1 is a schematic representation of an IntraNet or Internet.

Referring to FIG. 1, the Internet communications arrangement works by allocating to each terminal end point a unique address. The address is that of a service provider or gateway to which individual terminals connect by way of local communications networks. Communications from any one point in the network to any other point in the network do not necessarily follow the same route. Messages from one terminal to another carrying an identifying address and responses carrying a reverse address. The communications arrangement shown here as data transport network 1 transfers data between terminal end points.

Terminals connected may be, for example, personal computers having appropriate software these being represented by terminals 10–17. Such terminals access data pages on file servers for example 2–6 by sending a request message through the data transport network to the specified address for the particular file server data required. The file server will normally return a message by way of the data transport network 1 to the requesting terminal 10–17 and several pages of information may be downloaded as a single message or as a series of sequential messages.

A page of information may include links to other pages of information and the requesting terminal user may by use of access links forward further messages to the originating file server 2–6 to obtain subsequent additional information.

Figure 2:
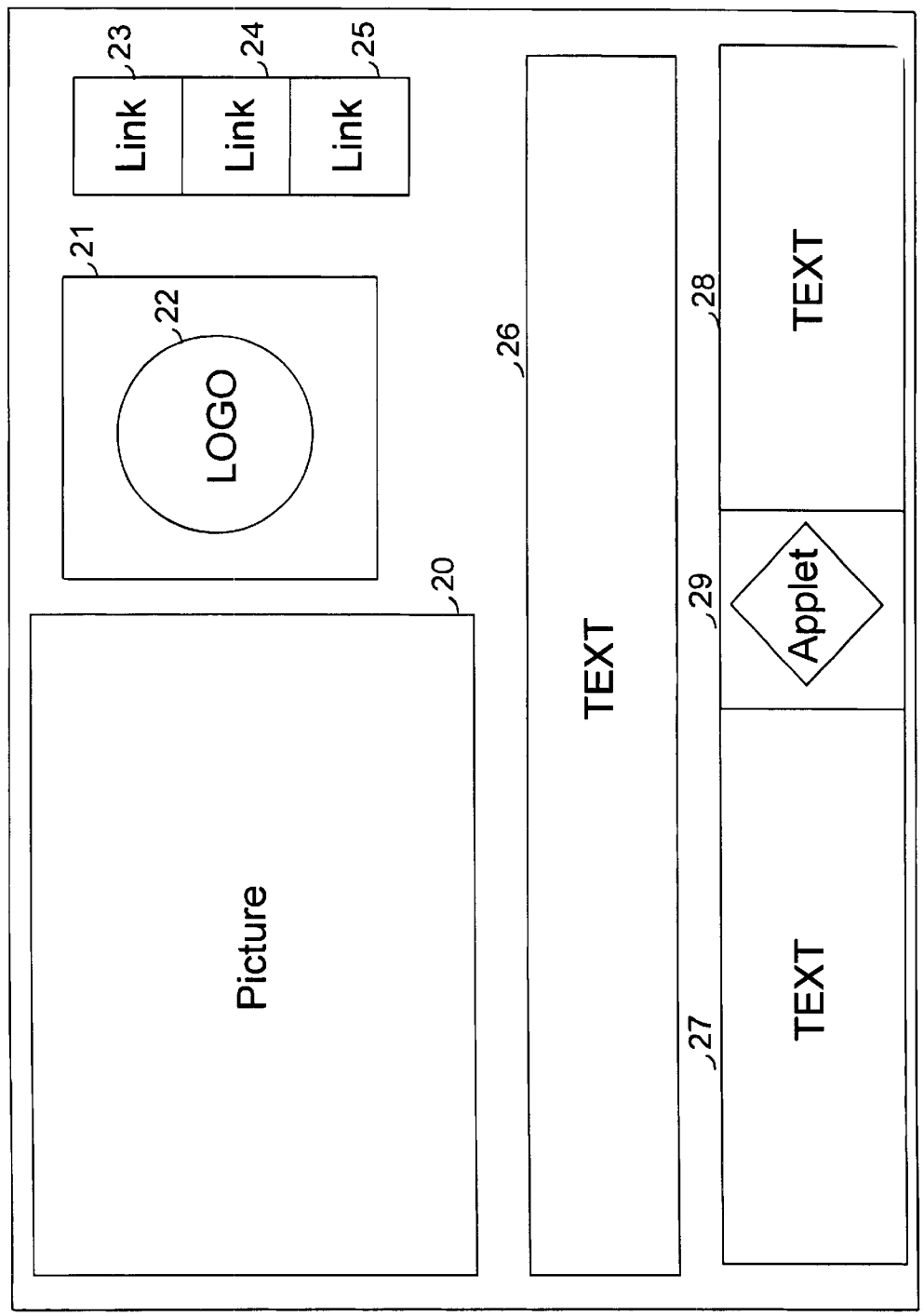
FIG. 2 is an example of a layout of a web page

Referring briefly to FIG. 2, a typical downloaded page for display may include a picture or photograph 20, a logo 22 in area 21, some link points 23, 24, 25, text areas 26, 27, 28 and some kind of moving image or scrolling text provided by a downloaded program as indicated by applet 29.

The links 23–25 enable an end user to point a cursor to a link button such that the browser program causes a message to be transmitted comprising the link address to fetch down additional appropriate information pages from a file server.

As has been previously mentioned, each individual page held in one of the file servers 2–6 must be individually created. Thus, for example, if the picture 20 of FIG. 2 requires to be changed but all of the other items on the page remain then it is necessary for the whole page to be created again. Similarly if, for example, items 21, 27, 29 and 28 the logo, text and applets were to remain the same with the picture 20 to text 26 and links 23–25 being the sole difference between two pages both versions of the page require to be stored in the file server.

Such arrangements are costly in terms of storage space and can make file management difficult particularly if some changes are required to say the common text 27 such that all of the pages stored require independent individual editing on the appropriate file server.

Referring back to FIG. 1, the present invention provides a master storage system 8 which is a large database, for example a relational database of the kind available from Informix Systems Limited and known as an Illustra database or a relational Oracle database. One of the purposes of the main storage system 8 is to hold data defining information accessible in many formats. Thus access to content of a number of file storage arrangements such as the file servers 5, 6 or other database or data store arrangements is pointed to or linked in some way. Additionally, data is defined in a specific relational arrangement and is held in the storage system 8.

Thus, in existing systems whenever a user of one of the terminals 10–17 sends an addressed message to a web site requesting information a complete page is recovered as stored from one of the file servers 2–6 for downloading. Now, in the present invention, when application is made for downloading of one or more pages from the storage system 8, a page is created at the time of application whether the application is from an Internet or Intranet terminal or for multimedia or interactive television purposes.

To enable this to occur, rather than creating a complete page to be stored, the service owner creates a template and a list of information or content to be included in the template. Thus to create the HTML page of FIG. 2, for example, a data table is created for the specific "ITEM" within the "SERVICE". The ITEM will define links to stored content for each of the areas of the template. Thus, by working through the item information a location of a file containing the picture information 20 can be established such that the picture can be recovered to the template. Similarly, the logo 21, 22 has a stored pointer indicating the location of the digital information for assembling that part of the template. Each of the texts 26, 27, 28 will similarly be indicated as will the links 23, 24, 25. A pointer to the applet 29, which may be stored in an adjacent file server for example, which may or may not have direct interconnection to the storage system 8 will also be provided.

Thus, a picture may be reused for several pages belonging to the same service provider but will only need to be stored once and any update of the picture does not require the re-assembly of a whole page but simple updating of the picture stored. Therefore, minor changes to items of text such as price changes on a specified date where the price change may form part of text 28 can be simply accommodated.

Figure 3:
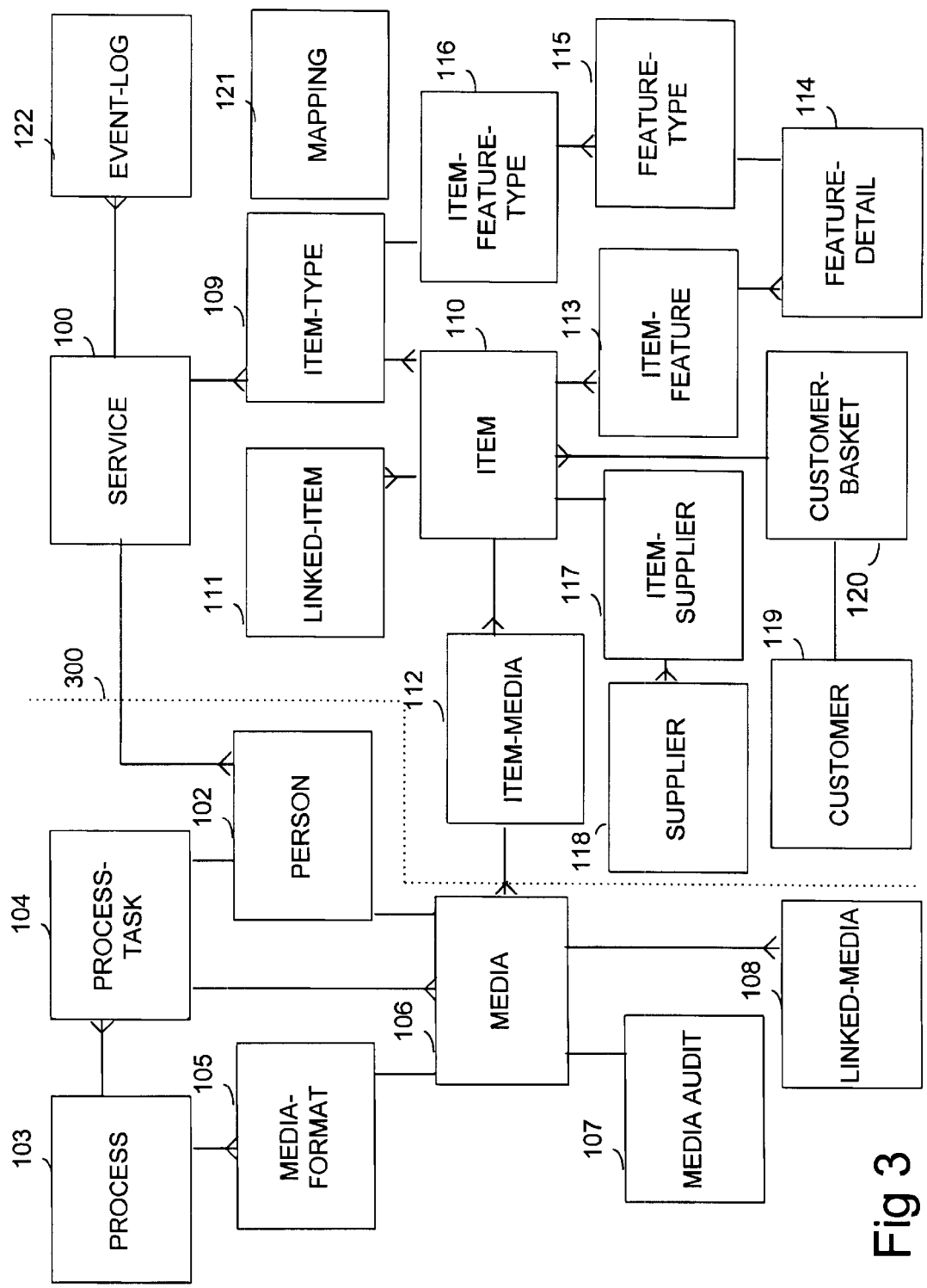
FIG. 3 is a data table arrangements in a part of the main database of FIG. 1.

In the current re-usable database, which may be an Illustra database from Informix systems Limited or an Oracle system database, each service held in common on the storage system 8 has a unique identity and, referring now to FIG. 3, a data table for SERVICE is provided. The service data table 100 is a unique partition of the storage system 8 and stores the filing attributes

TABLE 1

SERVICE
SERVICE_ID
NAME
DESCRIPTION
START_DATE
END_DATE
STATUS_FLAG
MAX_DISK_USAGE
CURRENT_DISK_USAGE
MODIFIED_BY
MODIFIED_DATE
OWING_SERVICE_ID

The SERVICE Table 1 above has a unique service identifier which is a numerical indication used by the database to associate each table of the particular service. The name will be that which is allocated by the user or service provider to the service he is providing.

Description is an alpha-numeric field having some information relating to the service being provided. Start and end date fields in the SERVICE table provide dates at which the service becomes available to Intranet users or available to Internet users as the case may be, so that the service provider may control the availability of the system to specific dates. The status flag in table 1 is used to indicate whether a service is alive, dead, pending or under test for example. Disk usage fields enable storage of information for use by the administrator to determine how much space in the system is available and how much is currently in use.

The modified by and modified date fields provide an historical record or audit trail within the particular service table.

The final field of the service data table is an owning service identity field which will contain a service id number if this service is a sub-service of another service. It is possible for a service hierarchy to exist in a sort of pyramid whereby one service may own several other services each of which may have come from different source data but each such service will have its own complete set of tables as shown in FIG. 3 and as hereinafter described. It is not possible for one service to be owned by more than one other service. This statement applies to all of the other data tables to be described hereinafter whereby each set of data tables is owned by a particular service whose service identifier will appear in a field of the table.

Also common to all of the tables of FIG. 3 in addition to the associated service identity, a modified by and modified date field are present to provide the required historical record or audit trail.

The modified by and modified date fields are automatically updated by the end users content management tool (hereinafter described) whenever any amendment is made.

The service identifier also segments all of the data in the storage system arrangement 8 and provides a level of security so that only appropriate users can access the data for modification purposes and only authorised users of an Intranet system are granted access to the particular service.

To facilitate understanding of the invention it may be appropriate to consider some specified services and it may be helpful to consider a service oriented database such as "Healthnet" and a retail oriented database "Shopnet". Both Healthnet and Shopnet may reside in the same database and have separate service identifiers. Thus referring to Table 1 for Healthnet, the service identifier field may contain the unique identifier 001, the name field Healthnet and the description "list of medical practitioners and their specialities", whilst for Shopnet the identifier may be 002, with a name of Shopnet and a description of "clothes retailing" for example. Healthnet may be self-owned and therefore have an owing service identifier of 001 where as Shopnet may be a sub-service of Big Stores Inc. who may have a service identifier of 003 and may own other related retailing networks such as Hardnet for hardware sales and/or Householdnet each having their own service arrangements.

It should be noted that any owning service is allowed full and free access to all of its sub-services. Therefore, if a web user for example were to log in to a top level service such as that provided by Big Stores Inc. it will be possible for that user to browse through all of the sub-services of that particular owner. Thus, it is possible to step down service levels of the pyramid.

The next data table to be considered is referred to as the PERSON table 102 and each service may have several associated person tables. The fields of the PERSON table associated with the service store information about people who have access to the content management system and the level of authority granted to them. Each person table has the following features.

TABLE 2

PERSON
PERSON_ID
NAME

TABLE 2-continued

DESCRIPTION
CONTACT_NAME
TELEPHONE_NUMBER
EMAIL_ADDRESS
READ_ONLY_PRIVILEGE
WRITE_PRIVILEGE
CREATE_PROCESS_PRIVILEGE
CREATE_PERSON_PRIVILEGE
MODIFIED_BY
MODIFIED_DATE
SERVICE_ID

Here the person identifier is again a unique identity number which is created by the content management tool whenever a person table is created. The name field may be an individual name or may be a departmental identifier for example. The associated description which may be a blank field could contain a job title. The contact name, telephone number and address fields contain alpha-numeric data used for the purposes stated. The four privilege flags define the access allowed to the service by the identified person or department.

Therefore, the person with Intranet read only privilege can access any of the data belonging to the service identified in the service id field but will not have any rights to modify any of the stored data. The holder of a write privilege may carry out certain functions such as modifying item type or other fields as hereinafter described whereas the create process privilege flag allows the person programming permission in respect of the particular service.

Finally, the create person privilege which, in respect of any particular ervice, is likely to be limited to only one or two identified persons, enables system administrators to create person tables and grant the three other privileges in respect of the identified service.

As been mentioned a plurality of person tables may exist in respect of any particular service. The relationship between the person tables 102 is one of person works for service (data table 100) and service employs persons (data tables 102).

Turning now to the process table 103, processes are used to carry out functions on content. For example, in creating a web page for transmission a process may require a document to be created, edited, converted into a different format or be verified prior to release. Each process is contained within a process table which has the following attributes:

TABLE 3

PROCESS
PROCESS_ID
NAME
DESCRIPTION
NUMBER_OF_STEPS
MODIFIED_BY
MODIFIED_DATE
SERVICE_ID

Each process is made up of a number of tasks which are held in individual process task tables 104. The process task table comprises the following:

TABLE 4

PROCESS_TASK
PROCESS_TASK_ID
NAME
DESCRIPTION
STEP_NUMBER
PRIORITY
OWNING_PROCESS_ID
OWNING_PERSON_ID
MODIFIED_BY
MODIFIED_DATE
SERVICE_ID

Also linked to the process table 103 is a media format table, again in a one-to-many relationship where there may be a multiple of media format tables 105 to each process table 103. The media format tables define different types of content which managed by the service and held in the system 8. For example there will be media format tables for executable files related to a process, image files, sound files, text pages and HTML pages. The system 8 maintains, track and stores all these different kinds of contents. The media format table comprises the following:

TABLE 5

MEDIA_FORMAT
MEDIA_FORMAT_ID
FORMAT
DESCRIPTION
PROCESS_ID
MODIFIED_BY
MODIFIED_DATE
SERVICE_ID

The process 104, for example, for creating a web page may require creation, editing, conversion, verification and release. These five steps will each be defined individually in a process task, which will perform in respect of the particular media format.

Each media format, for example picture files, will have its owned associated process and will go through its own process tasks for creating the function.

Process tasks are created by an owning person as identified in table 102 so that process tasks are not shared between different processes. In this way if a process task in respect of a particular process is modified as it is not common to any other process it will not affect any of the other processes in use in the system 8.

Turning now to the actual content or media table 106, every piece of media on the system that is any binary or non-binary objects such as an image, a movie clip, piece of paper, text, picture or other data which the system 8 requires to track has an entry in a media table which is related to a media format and is available for use by a process task. The media table 106 has the following attributes:

TABLE 6

MEDIA
MEDIA_ID
NAME
DESCRIPTION
VERSION
TASK_START_DATE
TASK_END_DATE
OBJECT_LOCATION
OBJECT_SIZE

TABLE 6-continued

STATUS
BEGIN_DATE
END_DATE
MEDIA_FORMAT_ID
CURRENT_OWNER
(PERSON_ID)
CURRENT_PROCESS_TASK
MODIFIED_BY
MODIFIED_DATE
SERVICE_ID

The fields of table 106 have a media id which is generated by the content management tool and a name which identifies the title of a document or picture or other content. The description field may be used to explain the content being an alpha-numeric field and a version number enables tracking of an output by virtue of increasing the version number each time the particular piece of media is updated. Task start date and task end date fields enable the system to monitor the availability of documentation and whether a task has been studied and/or completed within a required time period. The object location field is a pointer to the actual fields stored in file servers somewhere on the system and enables the relevant files, defining the text or picture image or content to be retrieved. The object size field enables the system to ensure that the entire file is recovered and that sufficient storage space is available within the system to recover the relevant object. The status field may again be used to indicate that the media referenced is available as live, pending or deleted. Beginning and end date fields may be used to indicate to the system dates at which the content pointed to by the media field is to be available to Intranet or Internet users as proposed by the content controller whose person id may be stored in the current owner field. The media format identification field refers to the linked media format table enabling the process to be used for handling the specific media to be identified. Process tasks work on media as directed by the object location. The current process task field indicates which of the identified process tasks has usage of the specific content.

Associated with specific media tables there may be a number of media audit tables 107. The media audit table 107 has the following attributes:

TABLE 7

MEDIA AUDIT
MEDIA_IDENTIFIER
DESCRIPTION
VERSION
OBJECT_LOCATION
OBJECT_SIZE
STATUS
MODIFIED_BY
MODIFIED_DATE
SERVICE_ID

The media audit table is automatically created by the content management tool each time a media table 106 is updated. This table will identify the media and its version prior to modification together with its location and size, thus providing an audit trail for any particular media table.

Finally as part of the documentation management system being those items to the left of line 300 of FIG. 3, the linked media table or tables 108. The linked media table comprises:

TABLE 8

LINKED_MEDIA
MEDIA_ID
LINKED_MEDIA_ID
COMMENTS
MODIFIED_BY
MODIFIED_DATE
SERVICE_ID

Each piece of media which is associated with another piece of media, for example where several associated HTML pages are linked, will have a respective linked media table. A comment can be included in the comments field of this table so that where links are provided on a HTML page such that the web end user can click on a link to be connected automatically to a subsequent page. The comment field may include a description such as title page, calling, detail page, number x.

Having considered the documentation system the linked tables of service per se will now be considered. The services 100 may comprise a large number of different items each of different item types and therefore a further table 109 of item types is provided in one to many relationship between service and item type. In the Healthnet example previously quoted an item type may be, for example, a doctor or nurse, physiotheripist or other medical staff. In a shopping organisation then such an item type may be, for example, trousers or skirts or similar such items. The item type table comprises:

TABLE 9

ITEM_TYPE
ITEM_TYPE_ID
NAME
DESCRIPTION
MODIFIED_BY
MODIFIED_DATE
SERVICE ID

Once again for the item type, the item type identifier is created uniquely by the system to ensure that there is a unique name to the item type and the description is entered by the operator by way of man-machine interface. As previously the modified by and the modified date provide an audit trail and the service identity controls access, for example, for modification purposes.

The item type table 109 is in one to many relationship with an item table 110 which comprises the following items:

TABLE 10

ITEM_ID
NAME
SHORT_NAME
PRODUCT_CODE
DESCRIPTION
BEGIN_DATE
END_DATE
STATUS
PRICE
STOCK_LEVEL
ITEM_TYPE_ID
MODIFIED_BY
MODIFIED_DATE
SERVICE_ID

While it will be appreciated that all of the integers of a table of this type are not necessarily applicable to all kinds of service which might be provided, the table attributes may be used for other purposes if required. As an example of items in an item type in Healthnet service (Table 100) by way of item type doctor (table 109) individual items may be doctors. Thus each individual doctor for which information is required to be stored is designated as an item in table 110. Again the table has a unique identifier created automatically by the program and this is followed by the doctor's name. The name field may actually comprise a surname, the short name field holding for example a forename. The product code is a unique identifier provided by the service provider and may come from existing records. The doctor's description may include, for example, the area or address of the surgery together with information possibly on qualifications.

Begin and end dates may include qualifying data or may be used so that certain doctors become available at certain specified times when access is requested from, for example, the WWW. The status indicator may again indicate whether the doctor is available for open consultation or is part qualified or temporarily suspended for example. Generally, speaking price and stock level would be unlikely to be used in a health care application. The item type identifier is associated with the previous table (table 109) and the modified by, modified date and service identifiers are used as before.

In a retail application items within an item type, such as trousers for example, would have a price and stock level included in the field of the item table.

The linked item table 111 may be provided in many to one relationship with each item table and comprises the following data fields:

TABLE 11

LINKED_ITEM_ID
COMMENTS
MODIFIED_BY
MODIFIED_DATE
SERVICE_ID

The linked item table allows associated items to be gathered together rapidly. For example, each doctor in a particular partnership could be linked so that in the construction of an HTML page associates could be listed. Thus complete clinic lists or complete hospital lists or complete partnership lists can be assembled by looking for all items linked to a particular other item.

The item table 110 is also linked in a one to many relationship with an item media table 112 so that links to media related to the particular item, for example pictures or picture files, can be recovered. The item media table comprises:

TABLE 12

ITEM_ID
MEDIA_ID
COMMENTS
MODIFIED_BY
MODIFIED_DATE
SERVICE_ID the media identifier allows access to the media table so that the location of items to be included in an HTML page, for example, can be identified.

To facilitate the use of the system in retail applications each item has access by way of an item feature table 113 to feature details in a data table 114. The item feature table 113 comprise the following:

TABLE 13

FEATURE_DETAIL_ID
ITEM_ID
COMMENTS
MODIFIED_BY
MODIFIED_DATE
SERVICE ID

Again several item feature data tables may be provided for each item, the features defining, for example, an item. In a retail organisation this may be colour or waist measurement, leg measurement or garment cut. Item features are linked to a feature detail table 114. This table comprises:

TABLE 14

FEATURE_DETAIL_ID
FEATURE_VALUE_1
FEATURE_VALUE_2
FEATURE_VALUE_3
FEATURE_VALUE_4
FEATURE_VALUE_5
FEATURE_VALUE_6
FEATURE_DATE_VALUE_1
FEATURE_DATE_VALUE_2
FEATURE_NUMBER_VALUE_1
FEATURE_NUMBER_VALUE_2
DESCRIPTION
FEATURE_TYPE_ID
MODIFIED_BY
MODIFIED_DATE
SERVICE_ID

The feature values are unspecified by the system and can be used by the service provider as he feels fit. Thus, for example, if an item feature indicator is colour then the feature detail may be actual colours e.g. red, blue, green etc. where if the feature detail relates to an item feature of leg measurement a size may be provided in the feature detail table 114.

It will be noted that the feature detail is also linked to feature type which links by way of an item feature type table 116 to the item type table 109. The item feature type table 116 comprises:

TABLE 16

ITEM_TYPE_ID
FEATURE_TYPE_ID
COMMENTS
MODIFIED_BY
MODIFIED_DATE
SERVICE_ID

While the feature type table 115 comprises:

TABLE 115

FEATURE_TYPE_ID
NAME
DESCRIPTION
MODIFIED_BY
MODIFIED_DATE
SERVICE_ID

Other tables for example an item supplier table 117 linking to a supply table 118 may be used in retail application to identify one or more sources of the particular item.

Transient tables may identify a customer by way of a customer table 119. The customer may have a number of customer basket tables 120 to provide a detailed ordering service whereby items requested to be viewed by the customer or for order by the customer may be stored in any customer basket table. Items may of course appear in several customer baskets.

The customer table comprises:

TABLE 117

CUSTOMER_TABLE
CUSTOMER_ID
CONTACT_NAME
ADDRESS_FIELD_1
ADDRESS_FIELD_2
ADDRESS_FJELD_3
ADDRESS_FIELD_4
ADDRESS_FIELD_5
TELEPHONE_NUMBER_FIELD
FAX_NUMBER_FIELD
EMAIL_ADDRESS_FIELD
START_DATE
END_DATE
STATUS
MODIFIED_BY
MODIFIED_DATE
SERVICE_ID

In this case the start and end date may relate to the availability of the service to the customer specified and the status may for example be the customer's credit rating.

Each customer basket has fields storing a customer identifier from the customer table 119 and an item identifier from the table 110 comment field and quantity field total price and the three service fields of modified by, modified date and service identifier. A customer may have several customer baskets on a one per item basis.

The final data table shown in FIG. 3 is a mapping table 121 of which their may be several on a per service arrangement. The mapping table comprises the following features:

TABLE 20

MAPPING_ID
ENTITY
MAPPING
MODIFIED_BY
MODIFIED_DATE
SERVICE_ID

The mapping table 121 enables each of the other tables to be customised within a particular service identifier for display purposes. Thus in Healthnet, for example, when a search is carried out for "items" an end user would not wish to see something headed "list of items" so that mapping table translates "list of items" to "list of doctors" whereas in a Shopnet example the list of items may be a list of garments.

The final use of data space within the database is for temporary tables (not shown) which act as a scratch pad for the user interface.

Having discussed the database it is now necessary to consider the use to which the database is put and to consider one scheme which will enable the data to be used in a logical manner to provide, for example, HTML pages for access by end users. Necessarily the service provider needs to create the information to be used and this may be accepted from an existing database e.g. by use of bulk loading techniques in which current parameters are sorted automatically into item types, items and features. Once the content has been so provided then the service provider may use a program to add additional items and features and to create templates which will be used by CGI access scripts to assemble information for live display.

Figure 4:
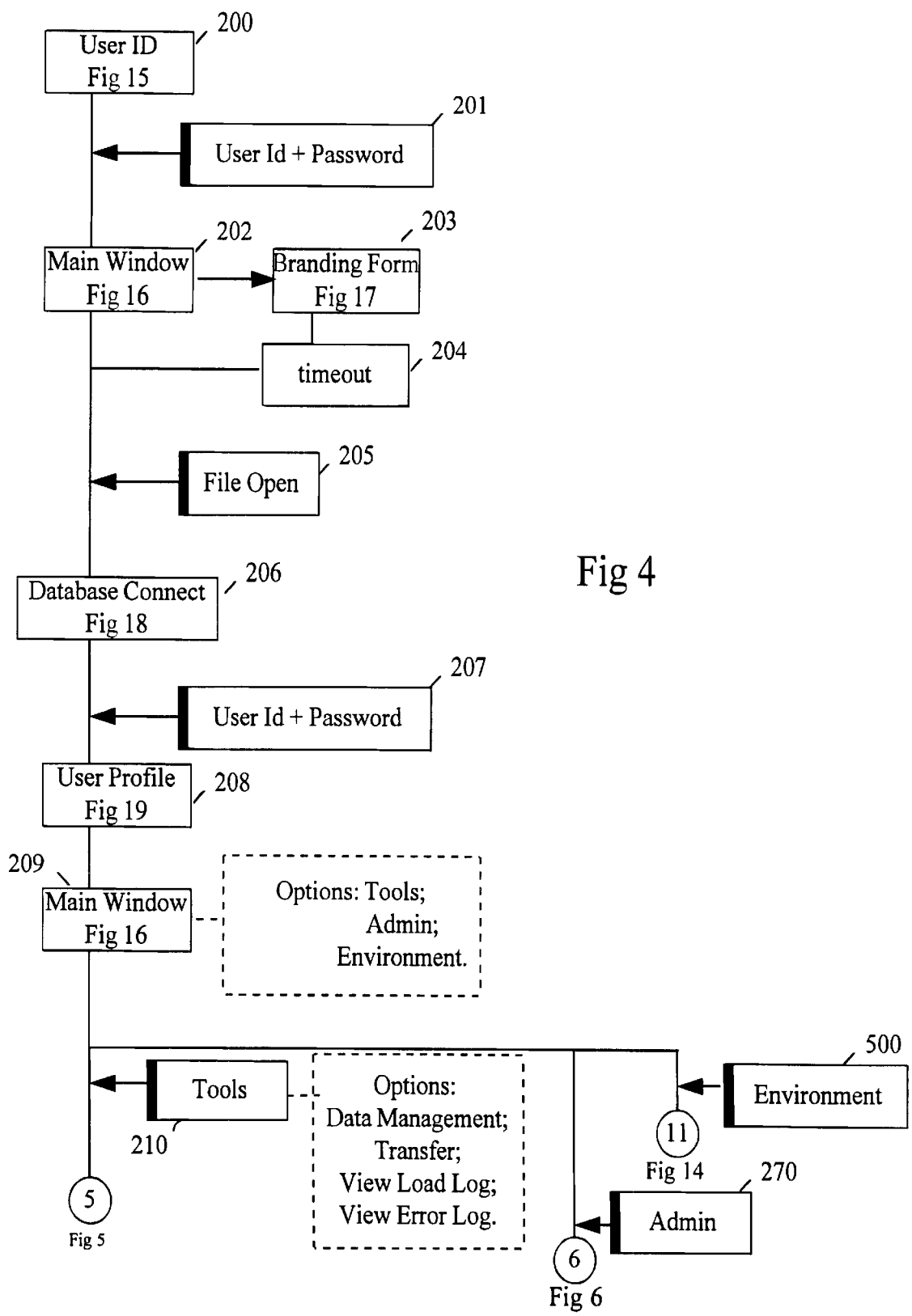

The content management tool now to be described runs in a Microsoft windows environment (registered trade mark) and a start point is shown at top of FIG. 4 to which reference is now made. When a personal computer (say terminal 14 of FIG. 1) running windows and having access to the content management program is activated then, as indicated at fields (600, 601) 200, a screen (FIG. 15) is presented to the viewer. This screen requires the user to enter a user identity and password at step 201 appropriate points being presented as shown in FIG. 15. The user may now operate an OK pointer (602) and, if the password and user identity are correct will step to an opening screen (FIG. 16) which is the background window for all subsequent parts of the program. If an incorrect password is entered in field 601 or the user ID 600 is not known then a message may be displayed indicating that the password is not correct for the user name entered and inviting a repeat attempt. Alternatively, the user may exit the system at point 201 (using an exit request pointer 603) and indeed at any point during the course of the program, in which case confirmation of the exit request in the form of a display screen with the message "Do you want to exit the application?" may be displayed so that the user can return to the current program point if exit selection has been made in error. On exiting, a local log may be updated once all windows are closed to indicate the date and time of closure and the user currently active.

Once the local user identity and password have been correctly entered at step 201 then, as previously indicated, the FIG. 16 window is displayed, a user message field 604 inviting the user to open an identified database using the file (605) menu. Initially the FIG. 16 screen is overlaid by an identity screen (FIG. 17) which indicates the program in operation and may provide other information to the user, this screen being displayed for a predetermined time 204 after which the FIG. 16 frame alone is displayed pending input at 205 of a file open instruction from the keyboard of the terminal 14 and/or by use of mouse and pointer arrangement.

The windows program will remain quiescent until such time as a file open request is made by the user and once such a request is made the user message box (604) of FIG. 16 is cleared and the screen is overlaid with a further user identity and password screen (FIG. 18) requiring the user to enter password and identity for the remote file in field 606, 607. At this point if the user cancels the request (screen link 608) then the user message box (604) is overwritten with connection cancelled by user and the application is closed. Assuming now that the user enters an identity and password and requests connection by use of the connect function, (609) the program 14 seeks access by way of the data transfer network of FIG. 1 to the MASS 8. If for any reason the system fails to connect to the remote database then the user will receive an error message "unable to attach to database", either as a screen message on the FIG. 16 screen in the user message field box (604).

Figure 19:
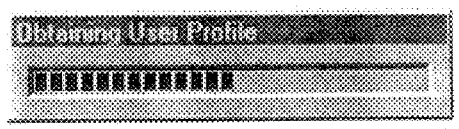

On a successful connection after the entry of user identity and password at step 207, at step 208 a pause screen (FIG. 19) is displayed while the system obtains from the MASS 8 the user profile from the appropriate service 100 and person 102 tables of FIG. 3. The returned information from the database person table will identify the user's service privileges and rights for subsequent control of the activity of the current user.

Figure 9:
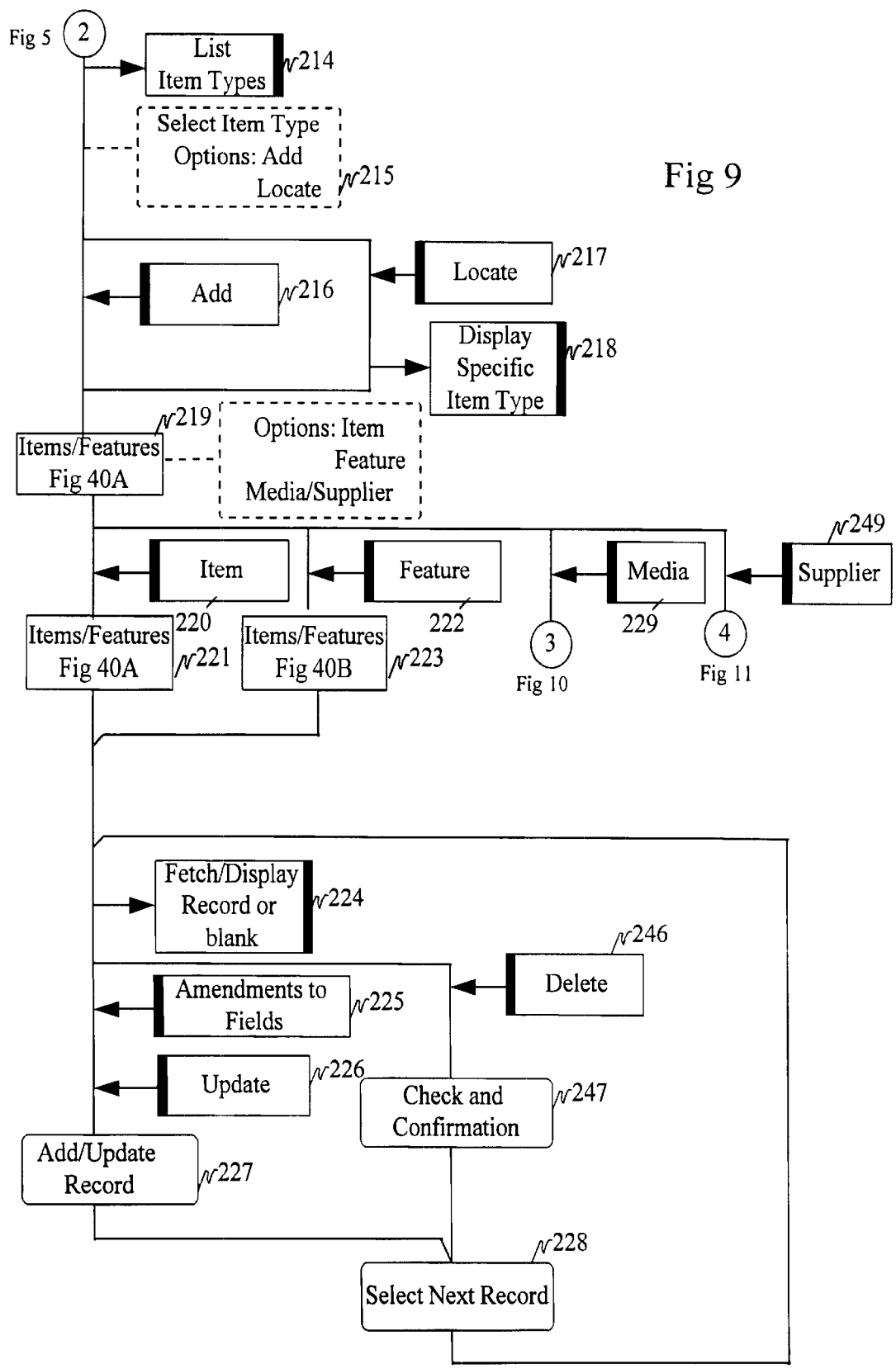
Figure 39:
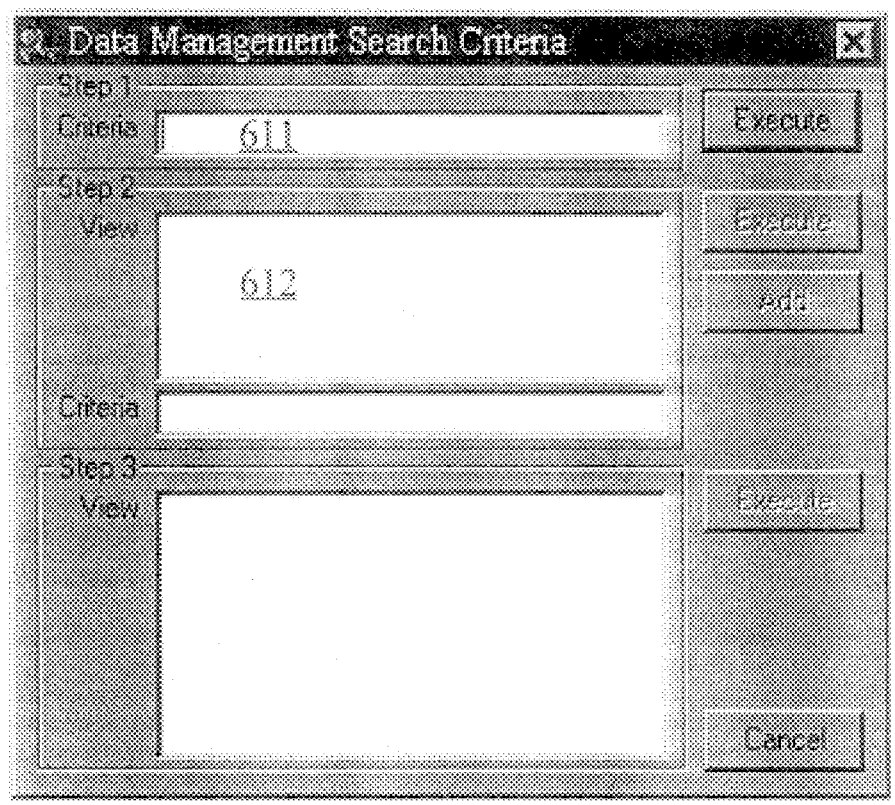

Once the profile has been received the "getting user profile" message is cancelled from the user message box (604) and, as indicated at 209, screen options of tools, administration and environment are offered in the window selection point (610). Most users will only have access to the additional tools display (as shown in FIG. 16), administration and environment buttons (not shown) being activated only if the user has appropriate privileges as downloaded at 208. Opening the tools menu (605) allows the user options of data management, transfer, view load log and view error log on a drop down screen from the menu. The primary function is likely to be data management which enables the user to manipulate the content of the tables linked to the service which the user works with. Thus if the user selected data management at FIG. 5, 211, then a data management search form (FIG. 39) is loaded to the window and the user message box (604) of FIG. 16 is blanked. Assuming that the response to the screen displayed at 212 is the selection of item type in the first criteria field 611, (step 213) then the system selects from the remote database table 109 a list of item types for display on the view section (612) of the FIG. 39 form. Thus turning to FIG. 9 the user now has the option of selecting an item type from the list displayed at step 214 or of adding a new item type to the list. To add a new item type to the list the user enters the item type and description which will be stored in the item type table 109 at the MASS 8. This is indicated by the user input at 216. A flag indicating that an item type is to be added to the service database is set. In the alternative 217, if the user enters a locate instruction (217) having selected an item type from those listed in field 612, the specific item type is selected from the table 109 and transferred (218) for display at the terminal 14. The add item type flag is disabled and in both cases the system now displays an entry table, (FIG. 40*a*) with item (614) and feature (615) tabs and media (616) or supplier (617) selection buttons. If the user makes no changes or selects an item the FIG. 40*a* screen for item input is displayed. This enables, for example, an item name to be input field (618) during the display at 221 which causes the appropriate record to be fetched from the item table 110 for display. If there is no entry in the item name field (618) then the presented screen of FIG. 18*a* may remain blank to enable input of a new item. Returning briefly to the output from the screen FIG. 40*a* at 219, if the user selects the feature tab (615) then at 223 the FIG. 40*b* selection screen is shown. Again, the appropriate feature type may be fetched from the table 115 for display at 224. The user may now edit the content of the records as indicated at 225 by making entries to the various fields (620) which while indicated as simple generic titles will carry appropriate names for the particular service 100 as derived from the mapping table 121 hereinafter described. If the user simply requests a delete (621) at 246 then a confirmation is required at 247 after which the selected record is deleted and the next record, if any, is selected at 228 for display. If at 225 the user selected an add (622) or update (623) then the new record or the existing record is updated in the appropriate table 110 or 115 together with the sub-tables associated.

Note that deleting, adding or updating are controlled by user privilege and this field will be checked prior to activating amendment of records at the MASS 8.

It should be noted that an event log table (122) associated with the service may be updated each time a record is changed, the event log recording the identity of the user, and the date and time of change effected. This function may be activated or deactivated by a service administrator to avoid the event log becoming filled too rapidly. Thus only certain types of update may require an event log to be established.

Figure 10:
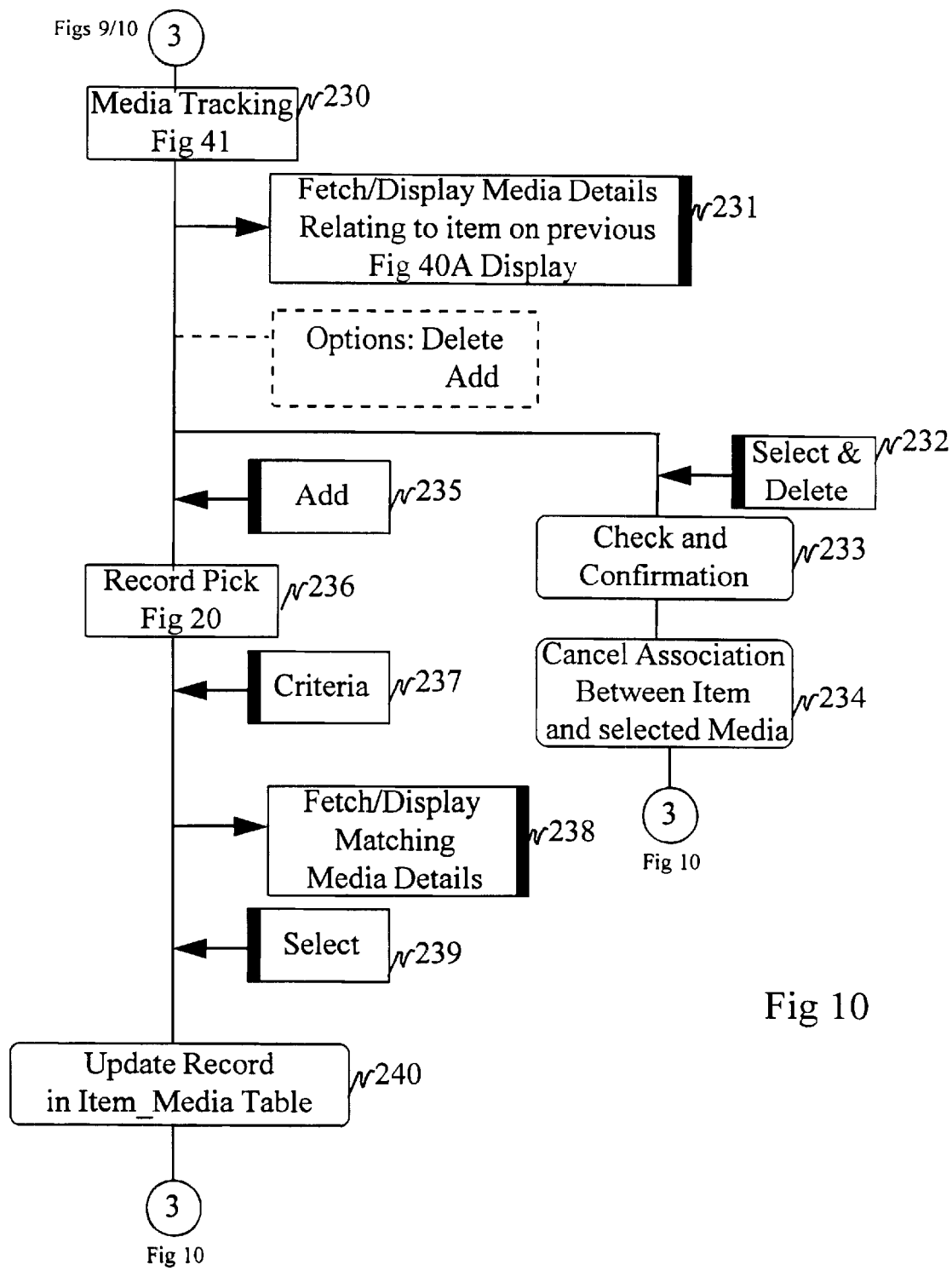
Figure 40A:
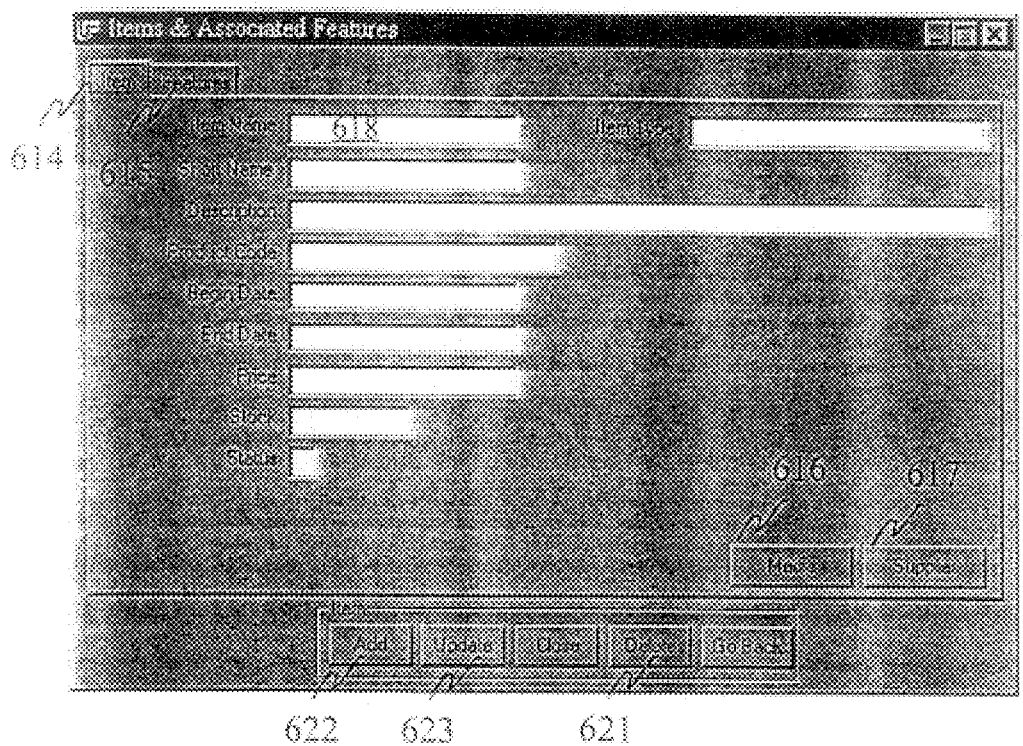
Figure 40B:
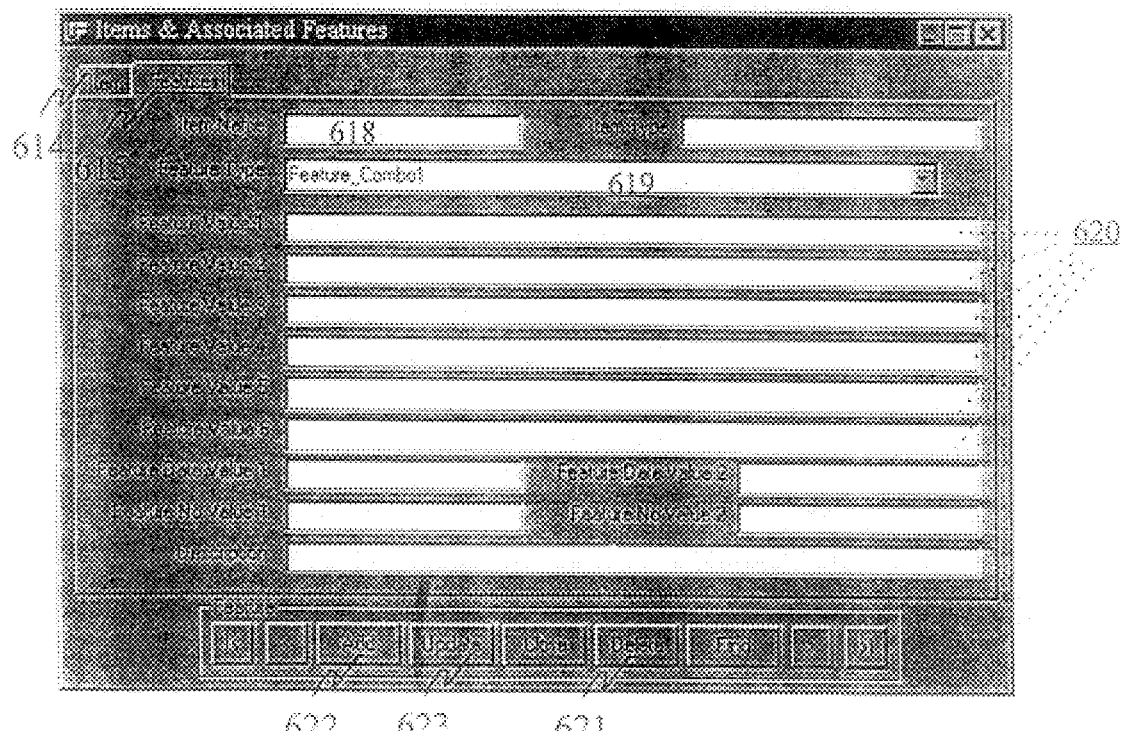

Returning now to FIG. 9, step 219, if an item is selected on the screen of FIG. 40*a* and the user selects a media (616) input at 229, then, as indicated on FIG. 10 at 230, paradata relating to media associated with the specific item as identified in table 110 as linked by the item media table 112 of FIG. 3 is displayed. The paradata displayed in the media ID field (625) and description (626) at step 231 may be added to or selected and deleted at the option of the user. If the use selects an item of paradata from the media table to be disassociated from the current item then a select and delete function 232 results in a check for confirmation prior to cancellation of the link in the item media table 112 as indicated at step 234.

Figure 20:
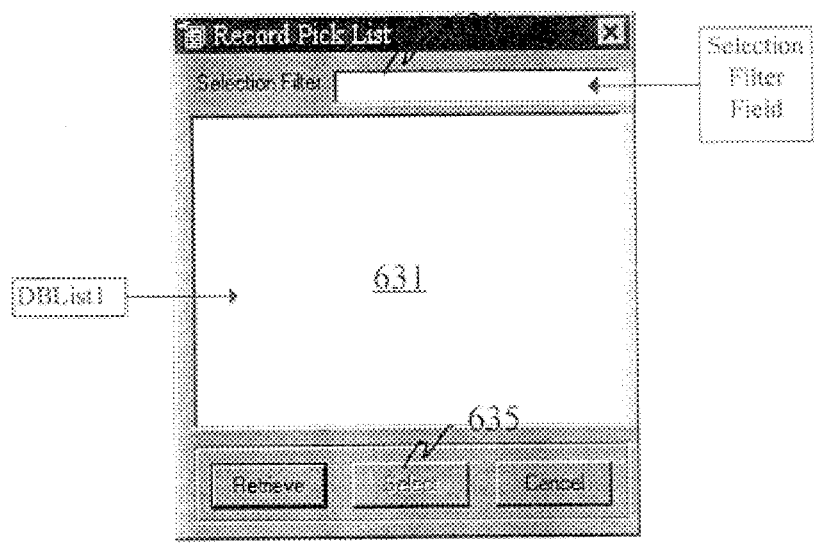

If the user indicates by an add input at 235 that the current item is to have additional media entered then the screen of FIG. 20 a pick list is displayed at 236 enabling the user to enter criteria such as file type (.WAV.PIC.HTML etc) in a selection field (630) at 237. Metadata relating to the media links available to the service as indicated in the media table 106 may now be recovered and the records displayed in field 631 (step 238). The user may now select items (239) to be associated (if any) resulting in the item media table 112 having a link created between the item 110 and the media 106 at step 240.

It will be appreciated that the selection filter entry at FIG. 20 may be more detailed and partial name or whole name searching could be used.

It is further noted that where a delete function occurs at 234 the media metadata is not automatically removed from the table 106 but remains present to identify for the user available media items from fileservers etc in the form of pictures, audio, applets and the like.

Should the user choose to "play" a displayed media item at step 231 then the appropriate media format is identified from the media format table 105 associated with the media identified at table 106. The terminal 14 is now arranged to commence an appropriate player and data may be down loaded from the fileserver or data store position identified by the media metadata in table 106.

Figure 11:
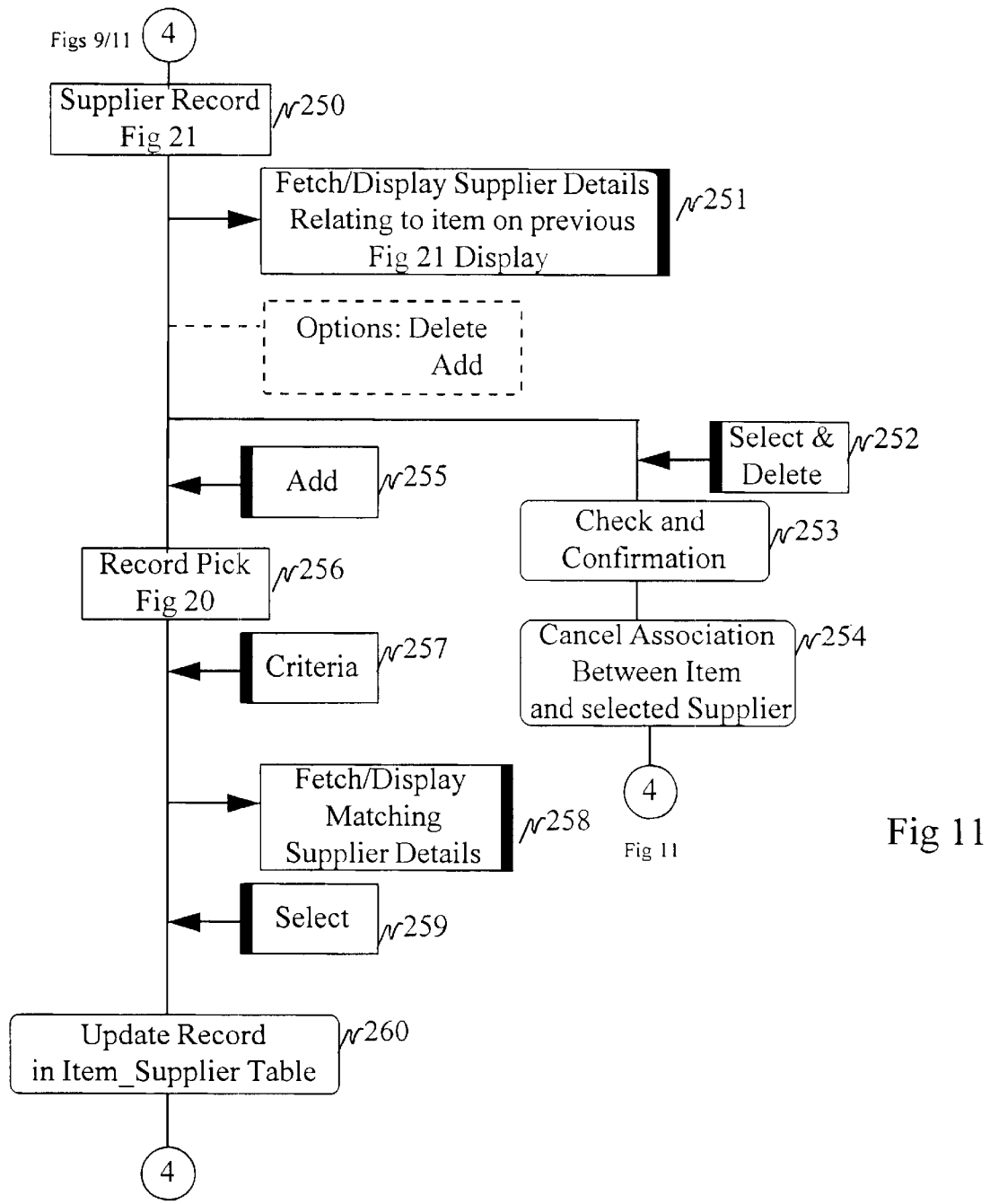
Figure 21:
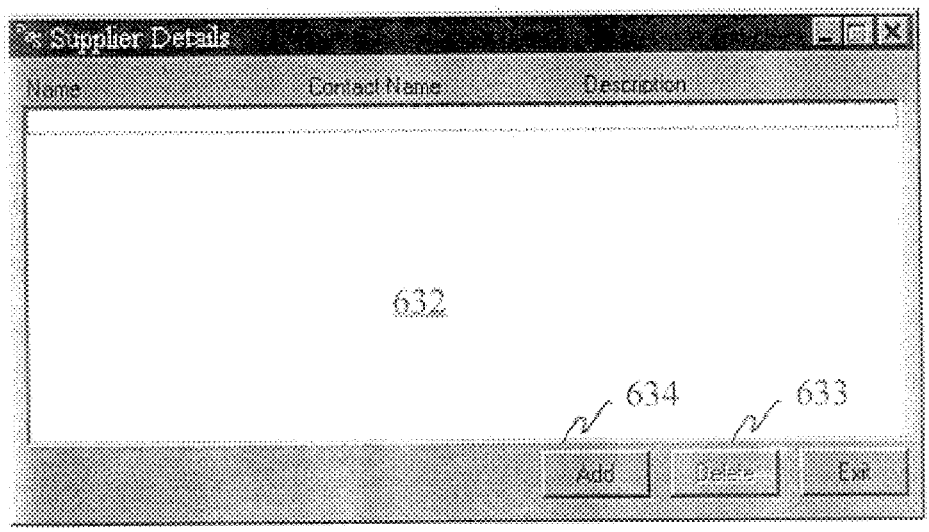

Returning again to FIG. 9, if after the output of FIG. 40a at step 219 the supplier function 249 is selected then the process of FIG. 11 is invoked in which the window table of FIG. 21 is provided whereby supplier details from the supplier table, as indicated in the item supplier, link table 117 in respect of the item previously displayed on the FIG. 40a display are recovered. The records are displayed at 251 on the terminal display 14 in the area 632 of FIG. 21 allowing the operator to delete 633 or add 634 suppliers as appropriate. Again, if a record is selected in field 632 and delete 633 is used then following a check and confirmation at 253 the association between the item and selected supplier will be cancelled in the item supplier table 117 at step 254. Note that the supplier record is not deleted from the table 118 but the association is cancelled.

If add (634) is selected as indicated at 255, then the FIG. 20 screen as previously described shown at 256 and is populated with appropriate supplier information records following entry of supplier criteria at 257. Thus matching records from the supplier table are displayed in area 631 at 258 and, assuming that the customer selects (635) one or more suppliers at 259, the appropriate record is updated in the item to supplier table where a link is created between the selected item and the selected supplier at 260.

It is noted that while FIGS. 10 and 11 indicate a circular program in the windows environment, the user may simply step out from the particular screen or out from the program on completion.

Figure 22:
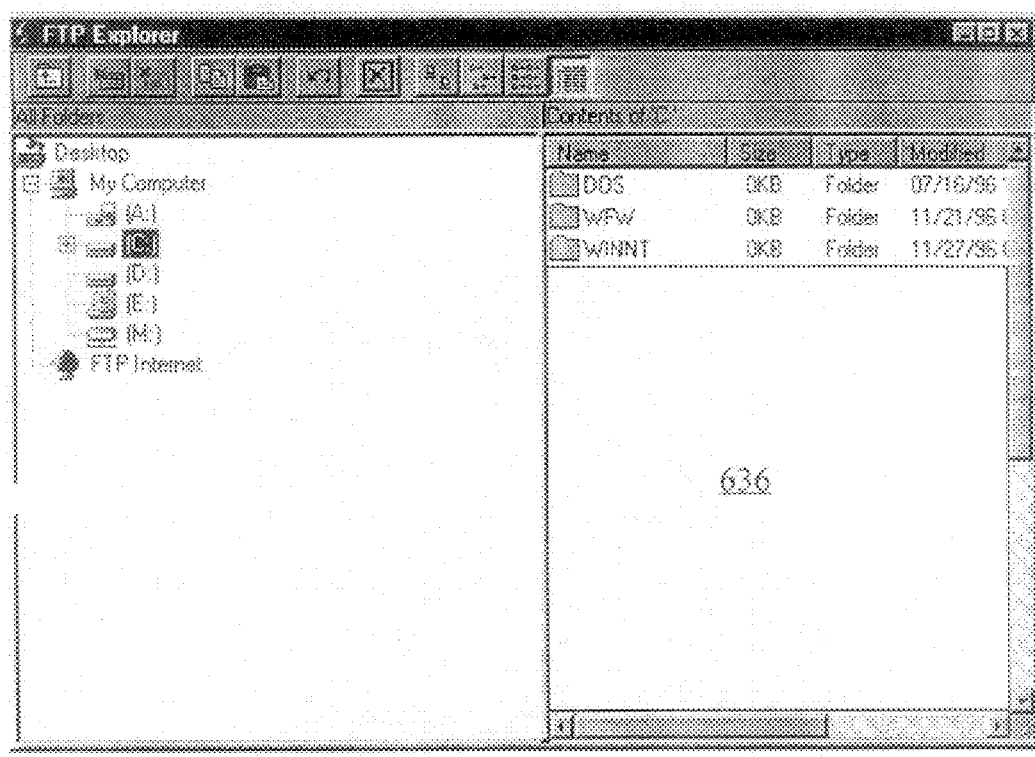

Returning now to FIG. 5, if following the basic display of FIG. 16 the user selects from the tools menu 613 a transfer function at 262, then a file selection criterion screen, FIG. 22, (only part of which is shown) may be displayed to enable the user to select files displayed in screen field 636 to be transferred. Once the user has selected a file to be transferred, such as an existing "flat" file of data for conversion, then having selected the data layout and identified the flat file criteria the system in the MASS 8 runs a bulk load program which takes the flat file data and the customer rules to populate an appropriate set of tables in the particular service. This file transfer is indicated as occurring at 261 and 263.

Figure 23:
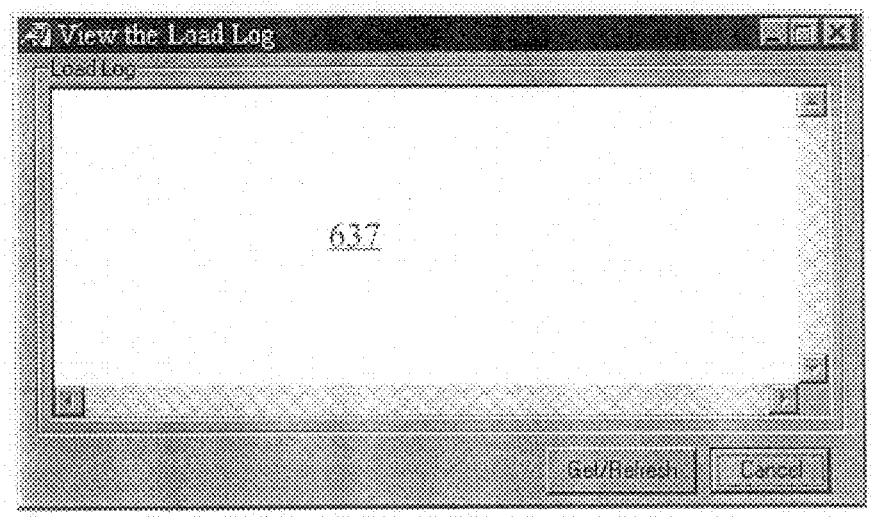

The view load log 264 and view error log 265 inputs will only arise if a file transfer has occurred. The BUL program provides a staged output indicating the number of records analysed and transferred so that at the FIG. 23 display 266 an instantaneous view a screen area 637 of the progress of the BUL program in loading a flat file transferred at 261 may be obtained.

Figure 24:
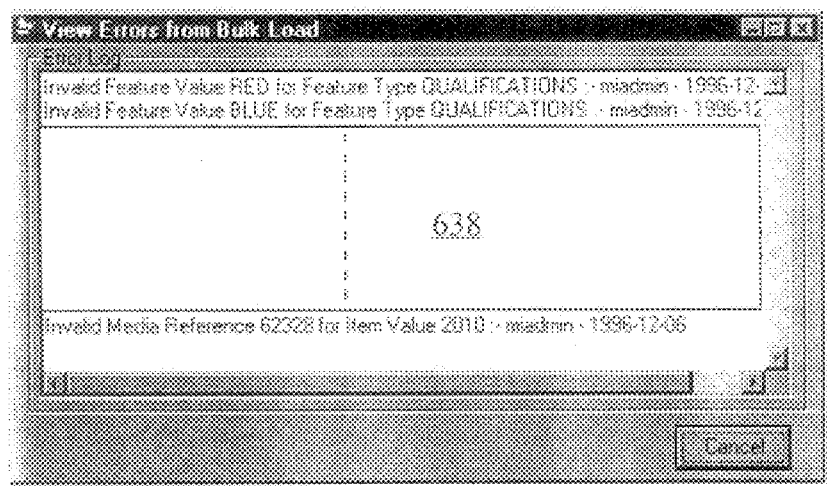

The error log created by the BUL program can be view by selecting at 265 an error table output which is displayed on the FIG. 24 screen at 269. This will provide in screen area 638 an identification of failures of transferring records from the flat file to the data base tables.

Having considered from FIG. 4 the potential windows displays from the tools menu 613 in response to the options available on FIG. 16 at 209, consideration will now be given to the functions which may be performed by a service administrator from one of the terminals. Thus if the administrative option is available as a result of the privilege check carried out at 208 then at 270 the user may select an administrator tab which opens up a file menu as shown in FIG. 6 having options of media management, item types, features types, media tracking, event viewer, associate, dissociate, users, customers and suppliers. Each of these items relates to an ability to manipulate one of the tables of FIG. 3 associated with the particular service of which the administrator has been identified from the appropriate person table 102.

Figure 7:
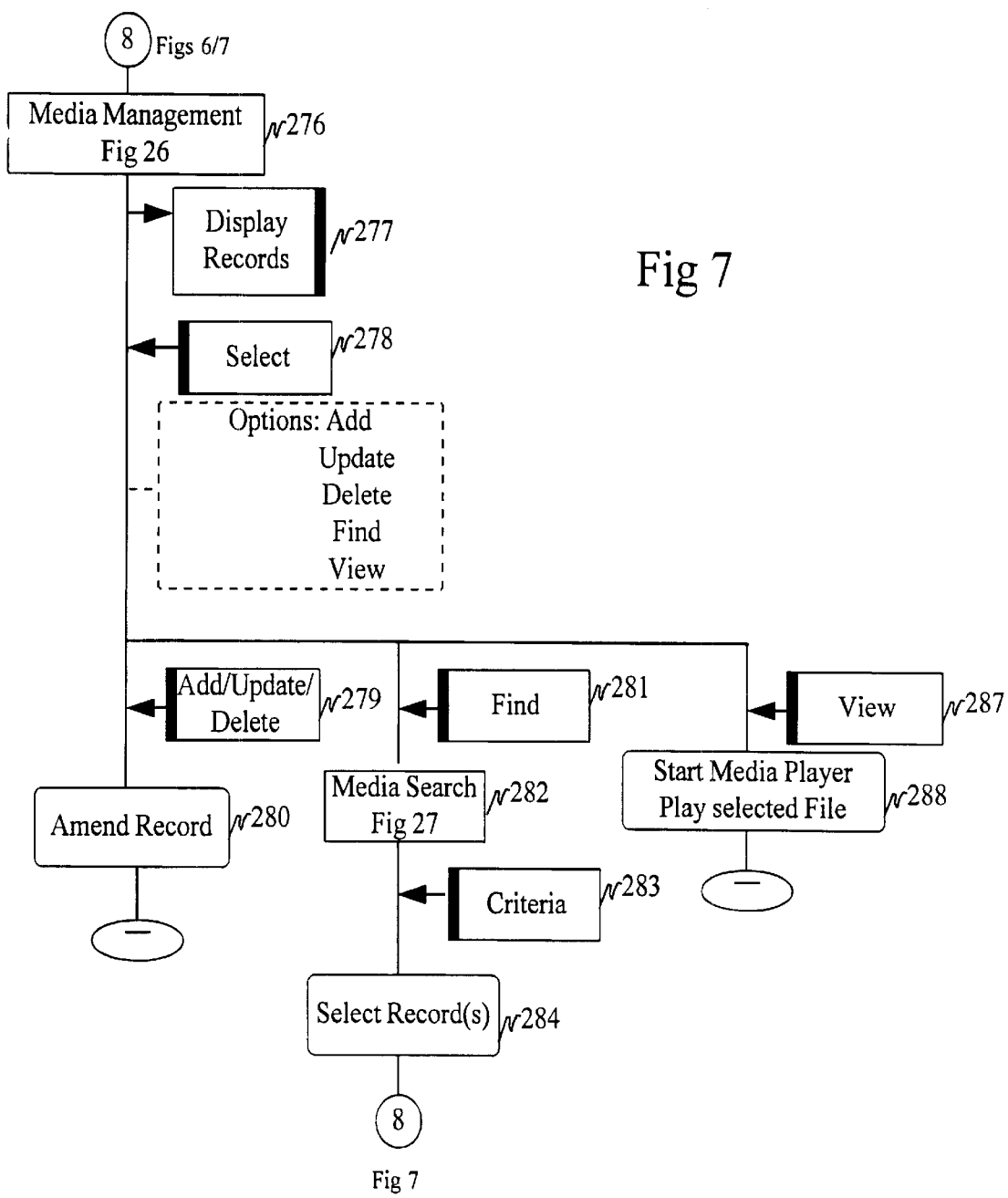
Figure 25:
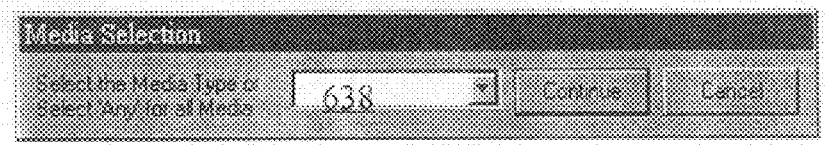

Thus referring to FIG. 6, if from the available options as indicated at step 271 media management is selected by the user, then at step 272 a media selection window, FIG. 25, is displayed to allow the customer to select the type of media required. Thus once the input of a media type in field 638is made at step 273 matching media hyperdata is displayed at 274 to enable the user to make a selection of required records at 275. Once the records have been selected in accordance with the selected criteria then the first record of the set is displayed in a window, FIG. 26, at 276 of FIG. 7 to which reference is now made. Thus records for each of the matching media are displayed as indicated at 277 to allow the user to make a further selection.

Once the selection is made at 278 then a number of options are available such that the customer may modify the various fields (639–645) associated with the particular media hyperdata record including such items as the end date 644, begin date 643 and the description 642. Object location 645, that is to say the file reference where the particular media item may be located can also be amended using this form. New records can be added (646) and existing records can be deleted (647) with appropriate confirmation of action. Thus, once at 278 the media management record field have been updated, the customer will select add (646), update (648) or delete (647) as indicated at 279 resulting in the appropriate record being amended in the media table 106, media format table 105 and the link media table 108. A record of the amendment will be entered into the media audit table 107 by the MASS 8.

Figure 26:
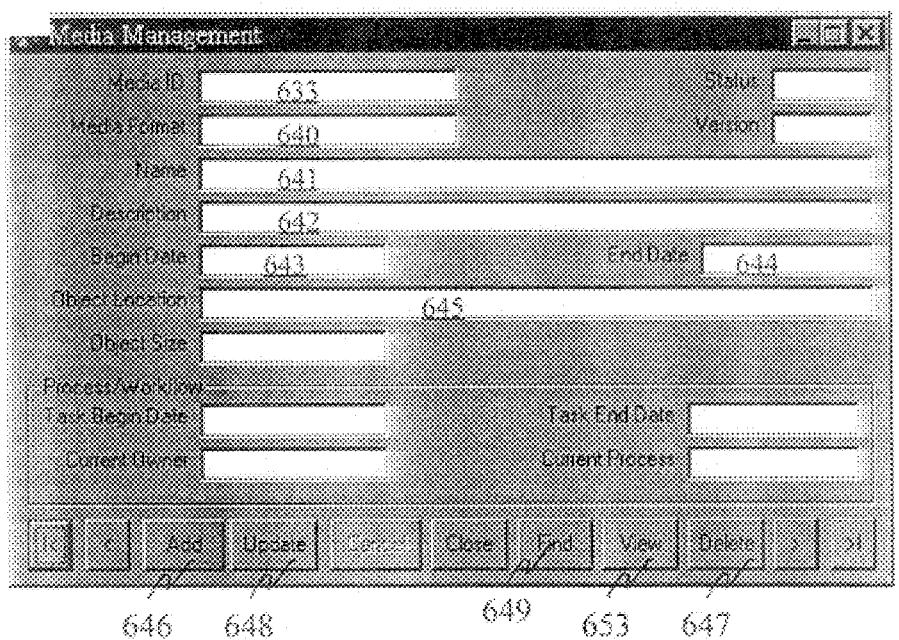

Process and process task records as held in tables 103 and 104 may similarly be amended using the FIG. 26 window.

Figure 27:
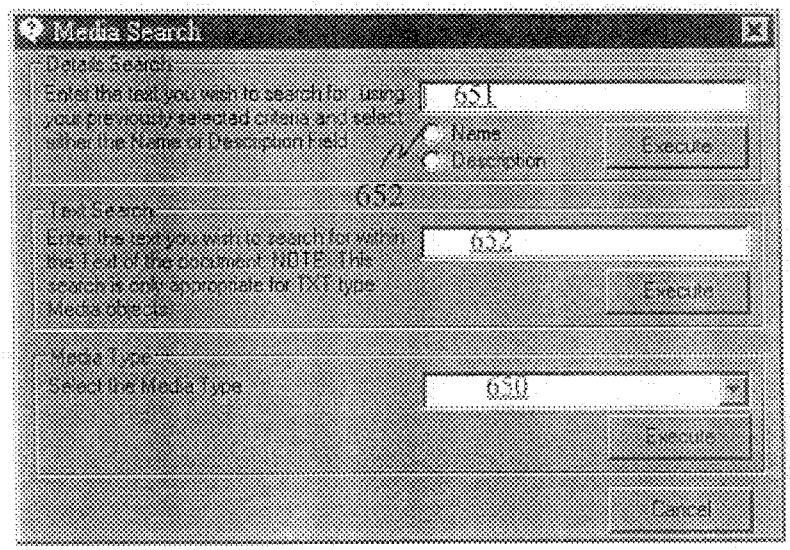

If, after the FIG. 25 and FIG. 26 displays, the user determines that an appropriate record needs to be found then entering the find (649) option at 281 results the display of a FIG. 27 media search window which allows data or text (651, 652) searching or searching by media type to be carried out. The user selects, for example, a name of a known record or some particular text for text matching, either directly matching or fuzzy matching to bring back an appropriate record relating to media. Media type (field 650) with specific name (651, 652) may also be specified.

Although not shown it is possible to carry out searches for specific picture content, for example by colour and/or shape matching using fields 651, 652.

Once the criteria have been entered by the customer at 283 appropriate records, if any, are selected (284) and again are displayed by return to the window of FIG. 26 as indicated at step 276.

Should at 278 the user select a particular record and then activate the view feature (653) at 287 then, in dependence upon the selected record type, for example .WAV, .PIC, .HTML, .GIF an appropriate media player i.e. audio/visual is selected by the system at 288 and the selected file is played. Again in common with most Windows programs it is possible to cancel from the screen display and return to the start point.

Figure 12:
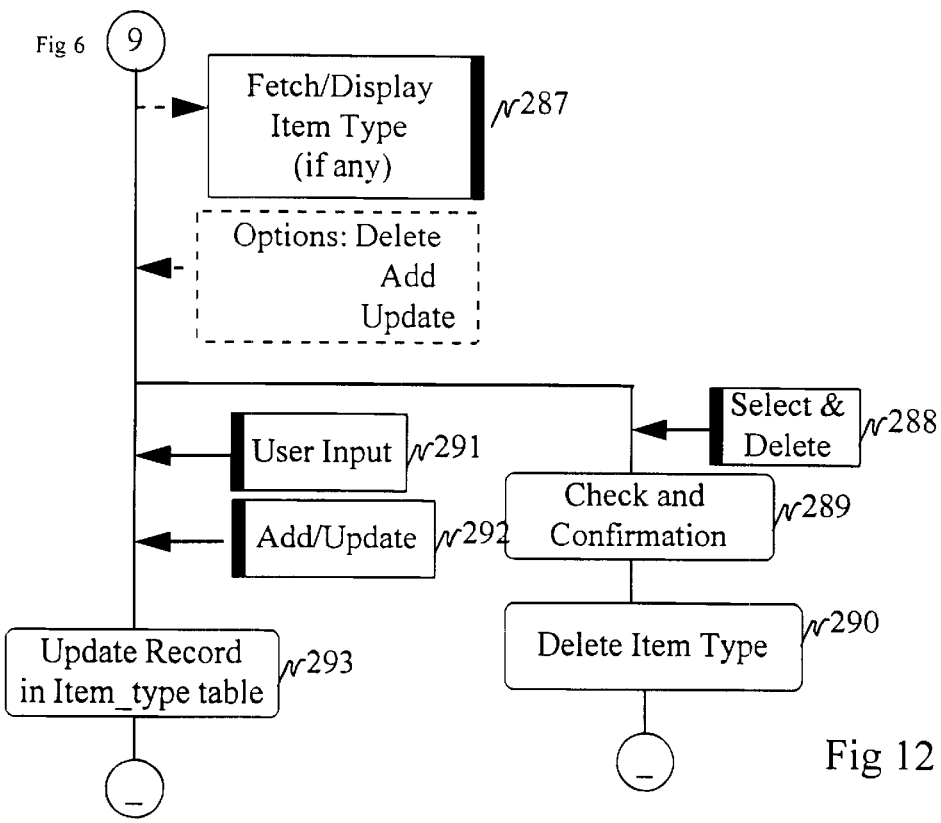
Figure 13:
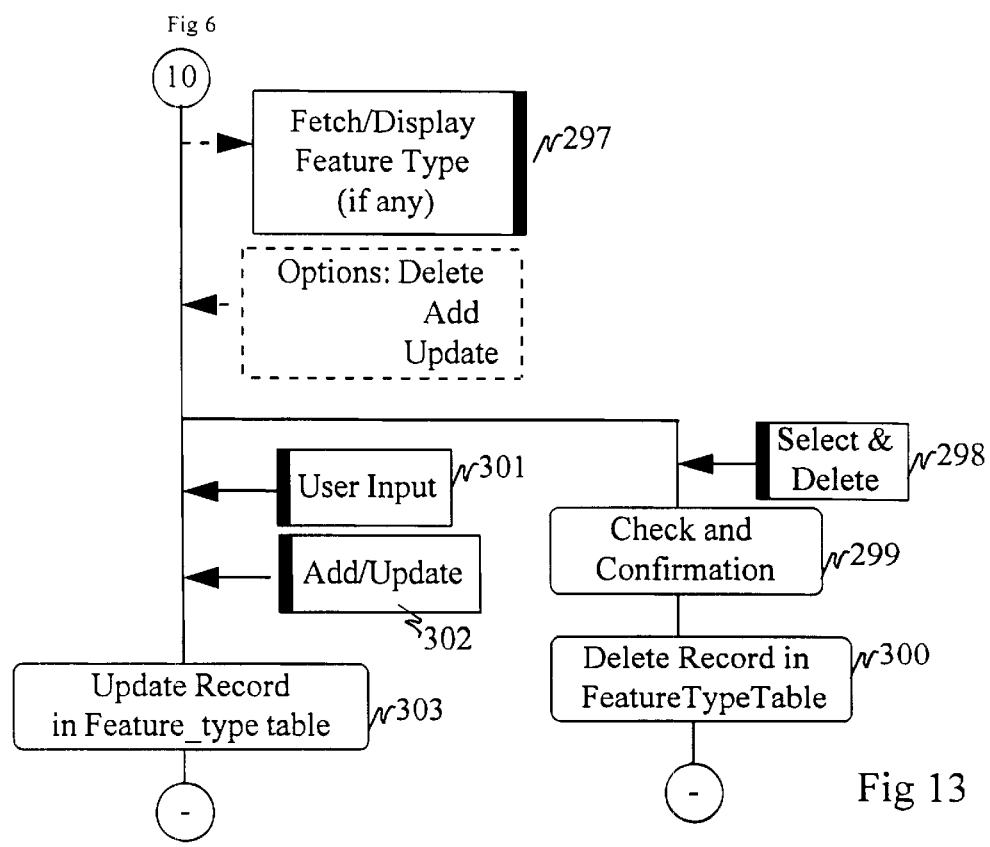
Figure 28:
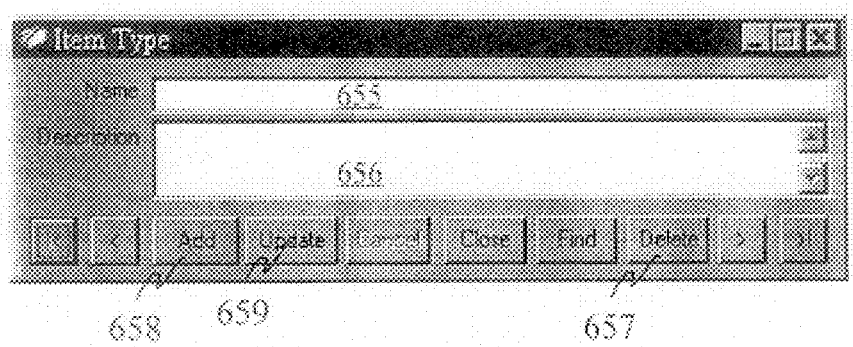

Returning now to FIG. 6, if from the options available at step 270 item types 285 is selected by the administrator then the form of FIG. 28 is presented in the window at 286 overlaid on the FIG. 16 display window. This allows the user to enter item type records for inclusion in the appropriate item type table 109 for the particular service 100. Assuming that an identifiable item type for the table 109 is entered by the administrator in field 655 then the appropriate record will be displayed in field 656 as indicated in FIG. 12 at 287. The user may now enter additional item types, together with an appropriate description or may amend the current record or require its deletion (657) in accordance with the options provided. If, as indicated at 288, the user selects a record for deletion a confirmation is required at 289 prior to the item being deleted from the table 109 at 290. Alternatively, at 291, once the user has input appropriate amendments or a completely new item type with description and requested add (658) or update (659) at 292, then the appropriate record is updated at 293 in the item type table.

Figure 29:
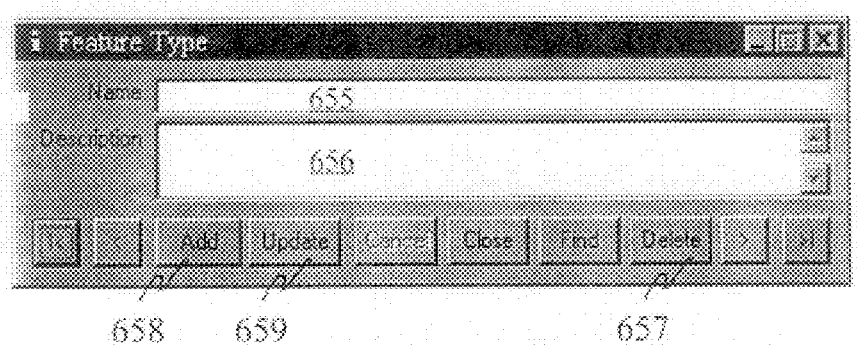

Returning again to FIG. 6, if the selection from the administrator menu is for feature type as indicated at 295 then the window of FIG. 29 is displayed at 296 and the same options and actions as described for item type with reference to FIG. 12 are permitted with regard to the feature type table. Thus at 297 any feature type selected by the user is displayed with the delete 657, add 658 and update 659 options selecting and deleting as indicated at 298 resulting in a check and confirmation at 299 that the record is to be deleted prior to the record being deleted from the feature table at 300.

User input at 301 to the name 655 and description 656 areas of the window of FIG. 29 can be used and once add 658 or update 659 is selected at 302 the feature type record is amended or added to the feature type table 115 of FIG. 3 at 303.

Figure 8A:
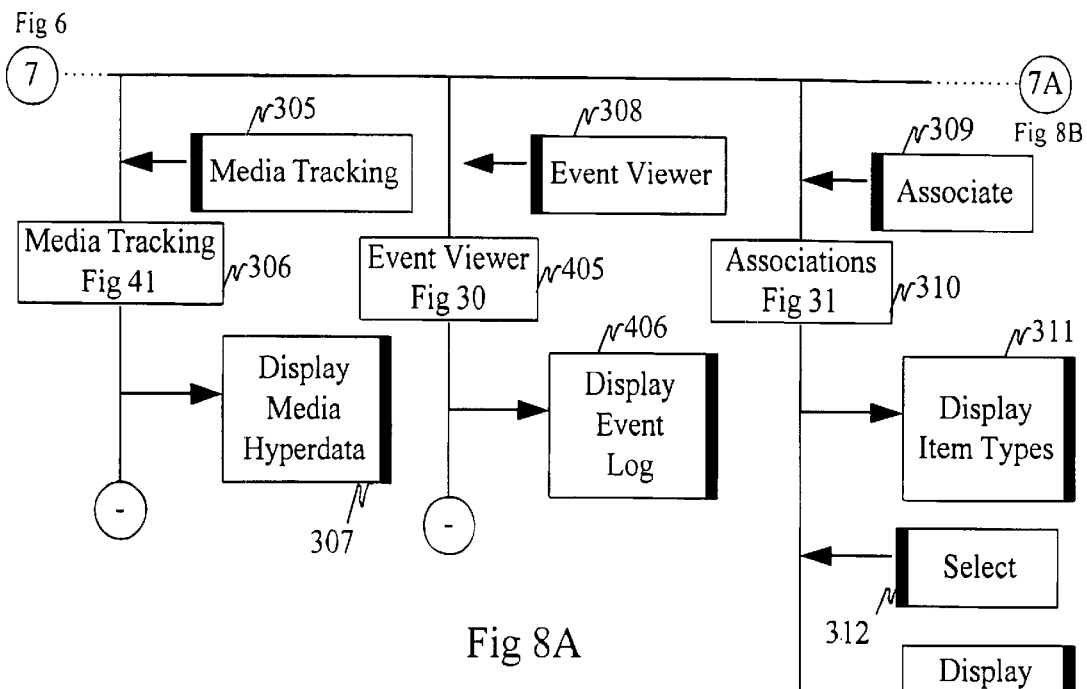
Figure 41:
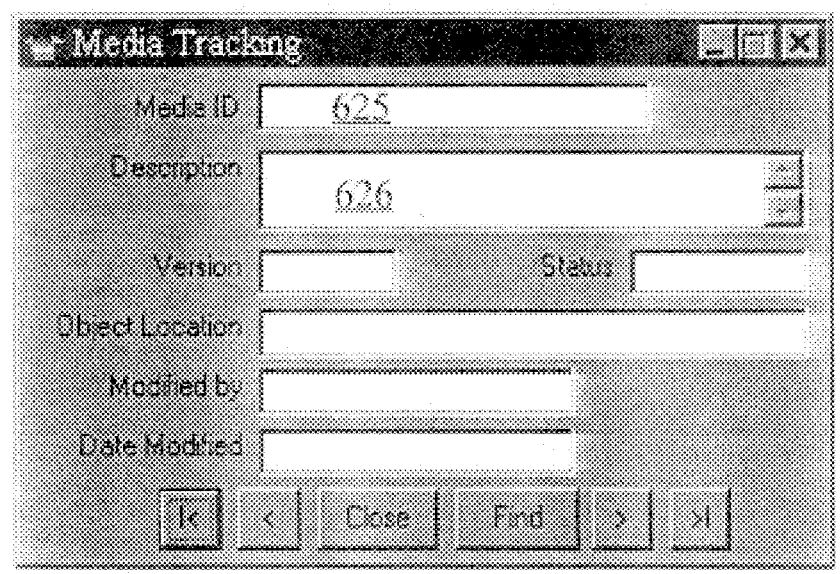

Returning again to FIG. 6 and also to FIG. 8a, if media tracking is selected by the user at 305 then the window of FIG. 41 is presented at 306 which displays media hyperdata from the media audit table 107 of FIG. 3 enabling the administrator to track any changes which may have been made to the media, media format, process, process task and linked media tables 103 to 108 of FIG. 3. Thus records from the media audit table 107 will be displayed at 307.

Figure 30:
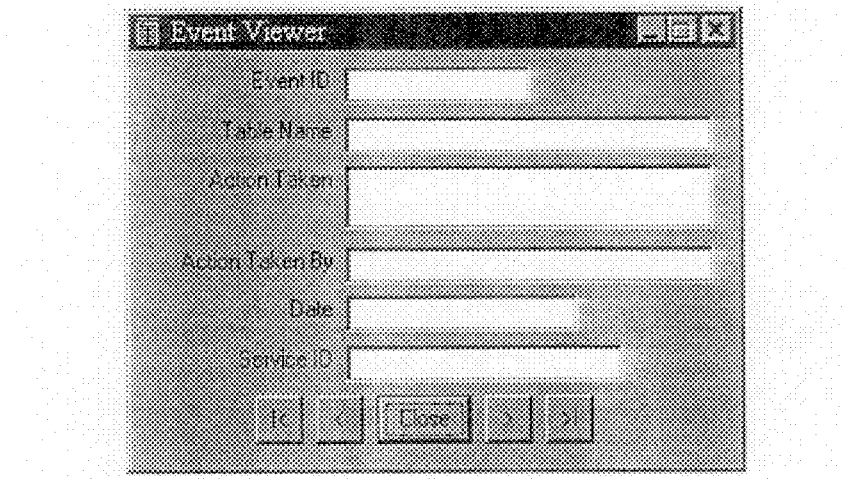

The event viewer option 308 results in the window of FIG. 30 being displayed (at 405), this Figure being derived from the event log table 122 of FIG. 3 which, as previously mentioned, is selectively updated each time any amendment is made to any of the tables. Thus at 406 the event log may be displayed and stepped through by the administrator to enable auditing of amendments to the data tables of FIG. 3 to be carried out.

Figure 31:
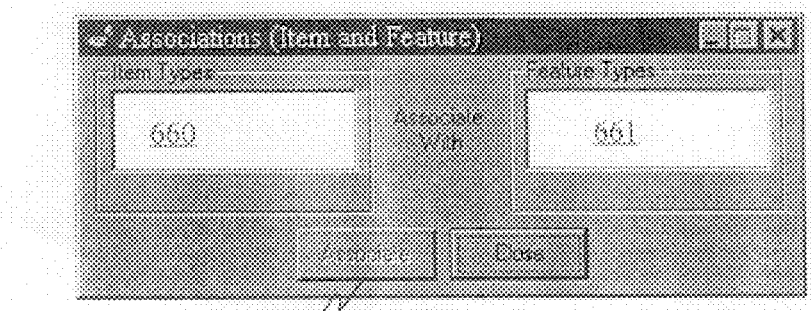

The administrator's associate function at 309 is used to create links in the table 106 between item types in table 109 and feature types in table 115. Thus at 310 the window of FIG. 31 is presented enabling items types from the table 109 to be displayed in area 660 at 311 so that the user may effect a selection of a particular item type at 312. Available features from the feature type table 115 associated with the service 100 will now be displayed in the feature type field 661 at 313 enabling the user to select features to be associated (662) at 314, so that the item to feature type table can be updated at 315.

Item feature types can be linked between items such as a television set in 109, which would be linked to features of screen in table 115, which may have features such as screen size as a feature detail in 114. Other features may include such things as the availability of teletext, stereo sound, wide screen format and the like. Similarly, a personal computer may be linked to a screen size and also to a disk size in feature detail table or feature type table 115 and a keyboard, for example. A keyboard as a feature type in 115 could also be linked to, for example, an organ in item type at 109 or other keyboard musical instruments.

Note that if the user wishes to add new features types this must be done via the window of FIG. 29 as previously indicated.

Figure 8B:
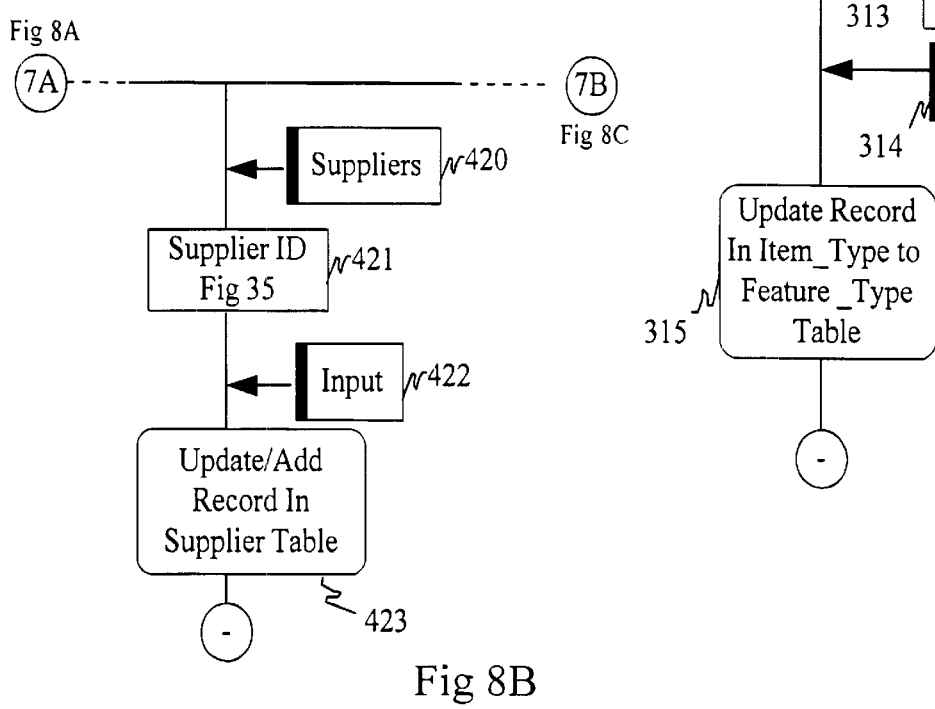
Figure 8C:
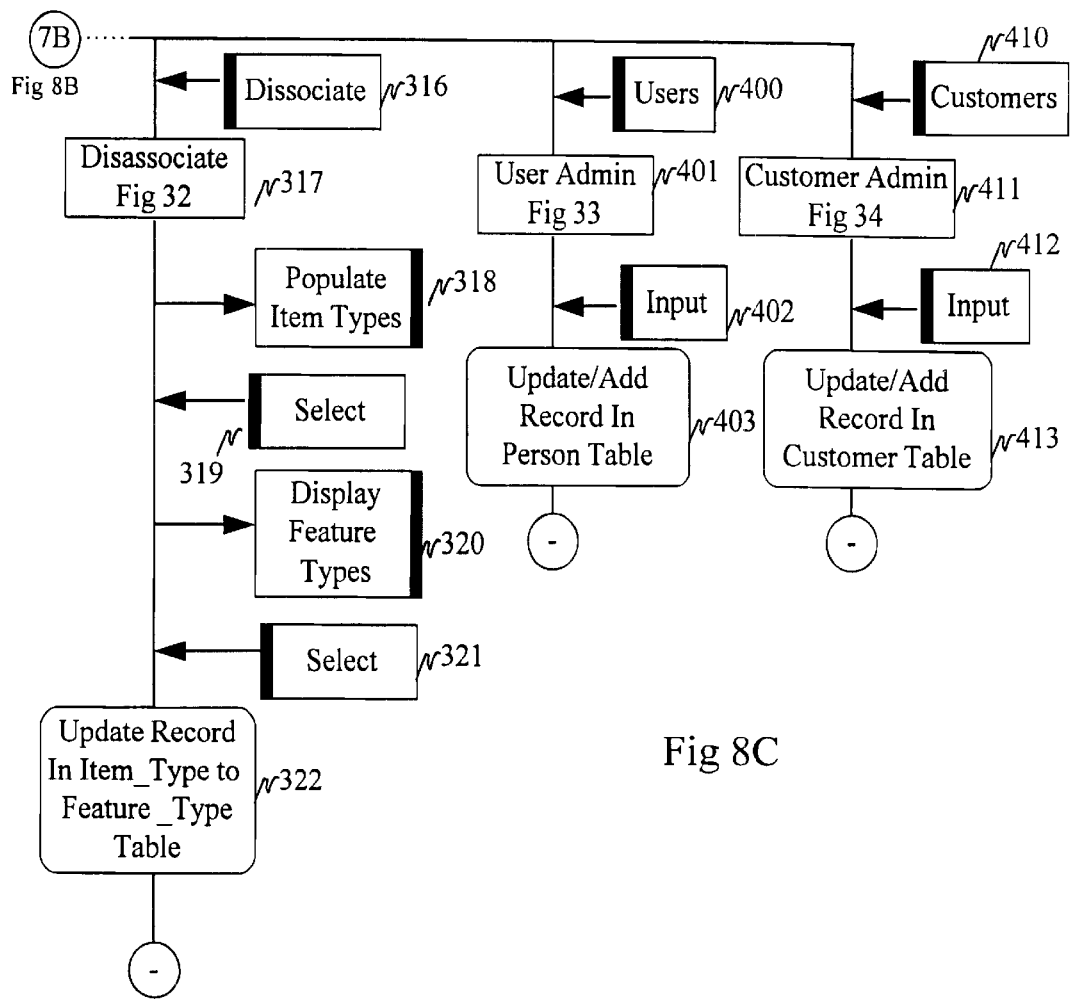
Figure 32:
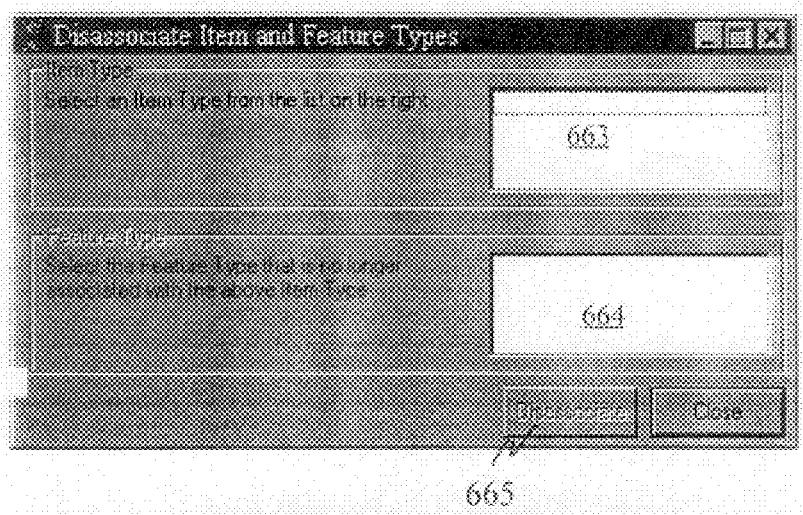

Moving on to FIG. 8c, the dissociate option 316 results in a disassociate window (FIG. 32) being displayed at 317 and appropriate records being selected from the table 109 for display in the item type field 663. Thus records of item types are shown at 318 enabling the user to effect a selection at 319. The item feature type table 116 is consulted by way of the data transport network 1 so that feature types associated with the selected item type are now displayed in the feature type field 664 of the window. This is indicated at 320 of FIG. 8c and the user is now invited to select from the feature types any feature which is required to be dissociated 665 and as indicated at 322 the association between the item type and feature type will be cancelled from the table 116 at the MASS 8.

Again note that the feature type is not deleted from the feature type table 115 this function again being a requirement of the feature type option of the administrator menu 295.

Figure 33:
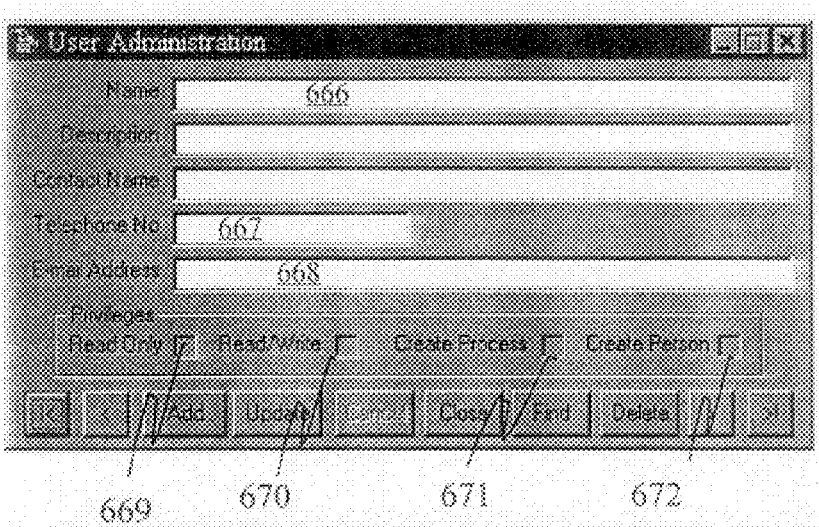

The user's function 400 enables the person table 102 to be updated at the MASS 8. Thus if the user function is selected then the window of FIG. 33 is displayed at 401 enabling the administrator to input details such as name 666, telephone number 667 and addresses 668 and to provide the appropriate privileges to enable the particular user to read 669, read and write 670, update various tables and particularly to enable specified persons in table 102 to create new processes 671 in table 103 and to add additional people 672 to the list 102, i.e. to create further administrators. Once the input has been made by the administrator at 402, then at 403 the appropriate person table is updated for the service 100.

Figure 34:
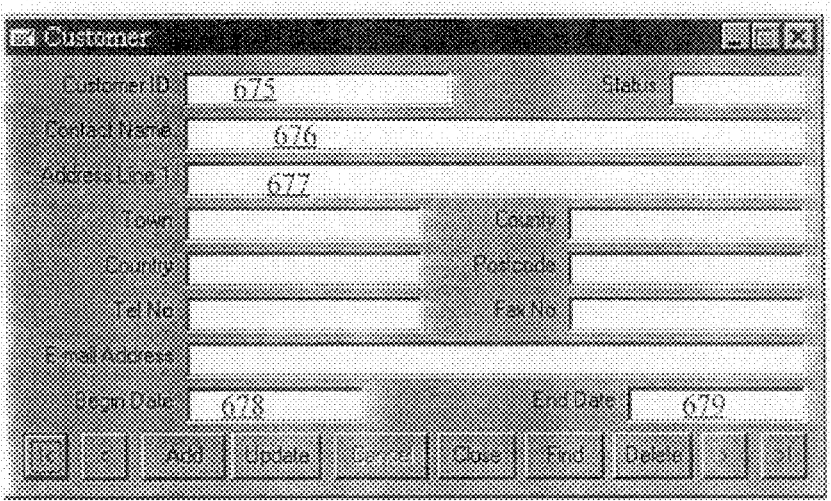

For the customer table 119 a selection of customer as indicated at 410 results in the display (411) of FIG. 34 enabling authorisation of a customer by the administrator. Thus at 412, input to the various fields of the window, shown at FIG. 34, presents a customer identity 675 together with personal details (676–677) and a period during (678–629) which the customer is authorised to access the database for the purposes of browsing through items and/or purchasing. Again once the window of FIG. 34 is populated by the administrator then the table may be updated at 413.

Figure 35:
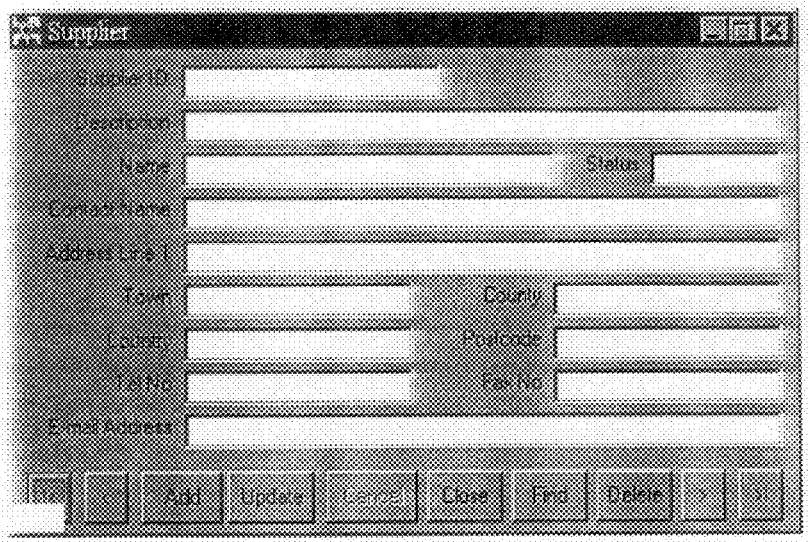

Turning to FIG. 8b, a supplier is selected at 420, then the display of FIG. 35 enables supplier details in the supplier table 118 to be added or amended appropriately. Note suppliers will be linked to items by way of an item supply table 117 and new suppliers can only be added via the administrative route. Again, then the window of FIG. 35 is populated at 422 by the administrator and the record is updated in the MASS 8 at step 423.

Figure 14:
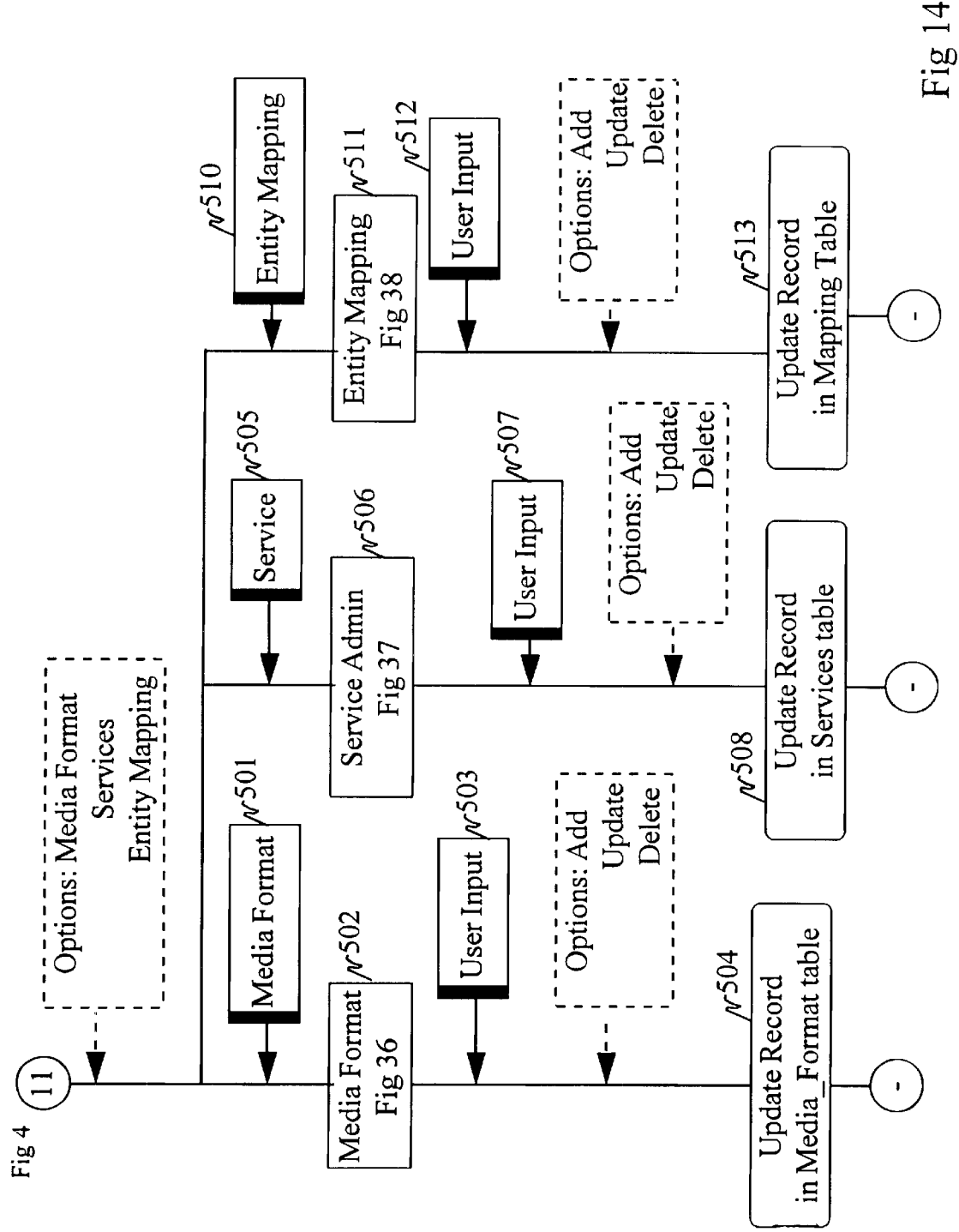
Figure 36:
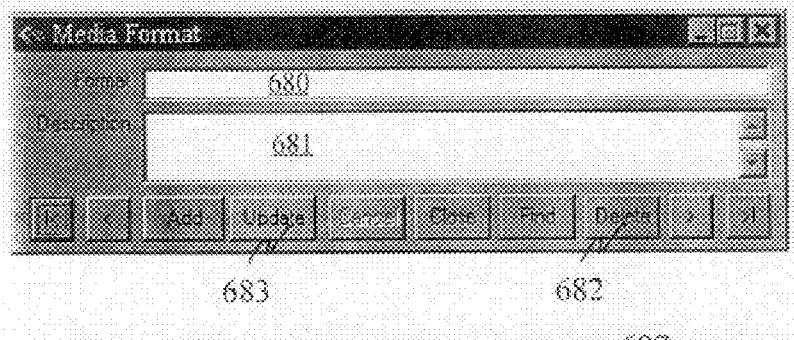

Returning briefly to FIG. 4, if after the FIG. 16 display (209) the environment option is selected, as indicated at 500, then as shown in FIG. 14 the options of media format, services and entity mapping and presented. The environment function is likely to be restricted to the senior administrator of the MASS 8 and first consideration is given to the media format option, as indicated at 501, which results in the display of FIG. 36. It will be appreciated that the MASS 8 may only support certain media format types (such as .GIF, .WAV, .HTML, .PIC for example) and the administrator needs to be able to control the type of media input available and media output as new media formats are added to the system. Thus, once the FIG. 36 window is displayed at 502 the user may populate the format 680 and description 681 or may update 683 existing media format information, as indicated at 503, or may delete 682 obsolete media formats or formats no longer supported by the MASS 8. The media format table 105 is updated once the window of FIG. 36 is appropriately completed. This is as indicated at 504.

Figure 37:
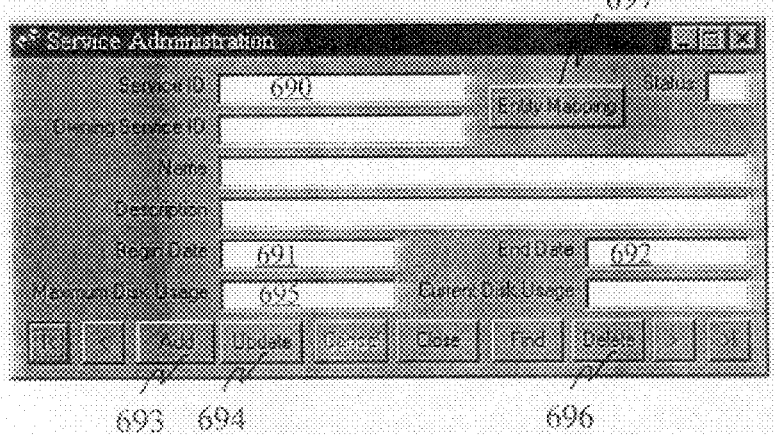

Taking the service option at 505, table 100 may be updated by a system administrator by populating a service window, FIG. 37, displayed at 506. Here the service identity 690 (for example shopnet, medinet etc) may be introduced with its appropriate administrative persons together with the begin 691 and end 692 functions indicating the period during which the service is available from the MASS 8. Generally speaking when providing a new service identity (693) by input at 507 enabling additional services to be introduced, existing services to be updated (694), for example by extending the end date 692, it usage and the like or by deleting 696 a service from the system. Thus at 608 the appropriate services table record will be updated.

Figure 38:
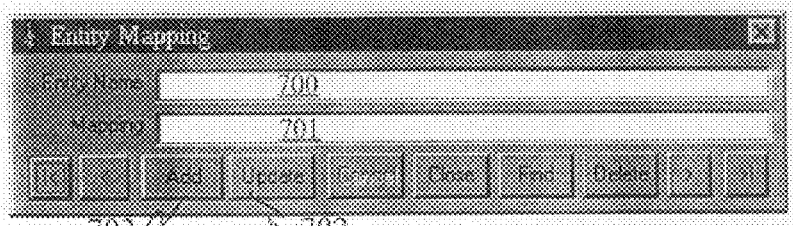

It will be normal for the system administrator to carry out an entity mapping 697 function in table 121 when services are added. This is indicated at 510 where the window of FIG. 38 is displayed in respect of the particular service 100. The mapping function determines the names 701 actually displayed to the end user in respect of the various tables of the system. Thus, once the FIG. 38 screen is displayed at 511, entity names 700 in the item type, feature type etc tables may be updated 702 or added 703 to by the system administrator. Thus at 512 a user input to the window 511 may be carried out and the mapping table in respect of the service 100 will be updated at 513.

For completeness it is noted that the usual help and about functions of windows programs are provided within the context of the content management tool hereinbefore described.

What is claimed is:

1. A system comprising: a database in combination with a service center connected to a data transport network,
   the database comprising:
   a hierarchical arrangement of data tables,
   said data tables including a service table and a plurality of record tables,
   said service table having a plurality of service entries each of which identifies a unique service,
   each service being associated with a respective set of record tables each of which has a data entry identifying its respective service,
   for each service at least one of the associated record tables including record entries which are linked to shared record entries in other record tables by linking entries in linking record tables; and
   the service center comprising;
   means responsive to customer requests received through the network, to assemble from a plurality of record tables in respect of an accessed service a presentation comprising details drawn from more than one of the tables, the assembly of the presentation occurring after receipt of the customer request, each customer request causing a respective newly assembled presentation to be transmitted to the customer whereby updating any displayable elenient in the presentation is immediately incorporated in one or more subsequent transmissions.

2. A system as in claim 1 wherein:
   a presentation for display is assembled on a template defining a plurality of areas of a display screen, each area requiring a defined format sub-display,
   each said defined format sub-display being assembled from records drawn from one or more record tables and/or from media files located from a record in one or more record tables, and
   the customer service center including means to assembly data defining a complete display and transmitting the assemble data by way of the data transport network.

3. A system as in claim 2, wherein the sub-display is updated without updating the remaining portions of the display.

4. A system comprising a content management tool in combination with a database,
   the database comprising:
   a hierarchical arrangement of data tables,
   said data tables including a service table and a plurality of record tables,
   said service table having a plurality of service entries each of which identifies a unique service,
   each service being associated with a respective set of record tables each of which has a data entry identifying its respective service,
   for each service at least one of the associated record tables including record entries which are linked to shared record entries in other record tables by linking entries in linking record tables, and
   the tool comprising:
   a terminal attached to a data transport network and having access to the database through the network, and being capable of receiving a request to enable the beginning of an assembly of a displayable information page to be transmitted to said transport network, each request causing a respective newly assembled displayable information page to be transmitted whereby updating of any displayable element is immediately incorporated in one or more subsequent transmissions,
   the tool including means to allow authorised end-users of a service to create entries for each of a plurality of record tables and to create and/or delete links between records in a fist of the tables and records in a second of the tables, and said links being held as data entries in a linking record table such that records in the second table which may be useable by more than one record in a first table are available for linking.

5. A system as in claim 4 including:

means to allow authorized end-users to enter data to cause up-dating of records in the second table such that entities referred to in said second table and which are common to entities in said first table require updating only once.

6. A system as in claim 4 including:

means responsive to end-user action to create additional records in the second table, said additional records becoming available for linking to records in the first table.

7. A system as in claim 4 including:

means to display to an end-user a list of records from the first table, means responsive to end-under action selecting a record from the list to display a list of records from the second table which are linked to the selected first record, and means responsive to user selection to delete links in the linking table to selected records in the second table.

8. A system as in claim 7 further including:

means to display a list of records available in the second table, and means responsive to end-user action to select one or more of the records from said list and to create a linking record in the linking table between the record selected in the first table and the record(s) selected from the second table.

9. A system as in claim 4 including:

means to select from hyperdata records playable medial identifiable from the hyperdata, means to recover data from a location specified by the hyperdata, and means to cause appropriate medial players to be activated at the terminal.

10. A system comprising: a database in combination with a service center connected to a data transport network, the database comprising:
 a hierarchical arrangement of data tables associated with a plurality of services,
 a first of said data tables comprising a service table identifying the plurality of services,
 each said service having a unique service identifier,
 the others of said data tables comprising a plurality of record tables,
 each of said record tables being associated uniquely with one service by inclusion of the respective unique service identifier for said service,
 each service being associated with a respective set of record tables,
 for each of said services at least one of said respective associated record tables including record entries which are linked to shared record entries in other record tables by linking entries in linking record tables, and
the service center comprising:
 means responsive to customer requests received through the network, to assemble from a plurality of record tables in respect of an accessed service a presentation comprising details drawn from more than one of the tables, the assembly of the presentation occurring after receipt of the customer request, each customer request causing a respective newly assembled presentation to be transmitted to the customer whereby updating any displayable element in the presentation is immediately incorporated in one or more subsequent transmissions.

11. A system as in claim 10 wherein;

a presentation for display is assembled on a template defining a plurality of areas of a display screen, each area requiring a defined format sub-display, each said defined format sub-display being assembled from records drawn from one or more record tables and/or from media files located from a record in one or more record tables, and the customer service center including means to assemble data defining a complete display and transmitting the assembled data by way of the data transport network.

12. A system as in claim 11, wherein the sub-display is updated without updating the remaining portions of the display.

13. A system comprising: a content management tool in combination with a database, the database comprising:
 a hierarchical arrangement of data tables associated with a plurality of services,
 a fist of said data tables comprising a service table identifying the plurality of services,
 each said service having a unique service identifier,
 the others of said data tables comprising a plurality of record tables, and
 each of said record tables being associated uniquely with one service by inclusion of the respective unique service identifier for said service,
 each service being associated with a respective set of record tables,
 for each of said services at least one of said respective associated record tables including record entries which are linked to shared record entries in other record tables by linking entries in linking record tables,
the tool comprising:
 a terminal attached to a data transport network and having access to the database through the network and, being capable of receiving a request to enable the beginning of an assembly of a displayable information page to be transmitted to said transport network, each request causing a respective newly assembled displayable information page to be transmitted whereby updating of any displayable element is immediately incorporated in one or more subsequent transmissions,
 the tool including means to allow authorized end-users of a service to create entries for each of a plurality of record tables and to create and/or delete links between records in a first of the tables and records in a second of the tables having the same service identifier as said first of said tables,
 said links being held as data entries in a linking record table having the same service identifier as said first and said second of the tables whereby records in the second table which may be useable by more than one record in a first table are available for linking to all of said records in said first table.

14. A system as in claim 13 including:

means to allow authorized end-users to enter data to cause up-dating of records in the second table such that entities referred to in said second table and which are common to entities in said first table require updating only once to update subsequent output from a plurality of said records in said first table.

15. A system as in claim 13 including:

means responsive to end-user action to create additional records in the second table, said additional records becoming available for linking to records in the first table.

16. A system as in claim 13 including:

means to display to an end-user a list of records from the first table, means responsive to end-user action selecting a record from the list to display a list of records from the second table which are linked to the selected first record, and means responsive to user selection to delete links in the linking table to selected records in the second table.

17. A system as in claim 16 further including:

means to display a list of records available in the second table, and means responsive to end-user action to select one or more of the records from said list and to create a linking record in the linking table between the record selected in the first table and the record(s) selected from the second table.

18. A system as in claim 13 including:

means to select from hyper data records playable media identifiable from the hyper data, means to recover data from a location specified by the hyper data, and means to transmit the data to appropriate media players.

19. A method of creating displayable information pages for transmission to a terminal through a data transport network the method comprising the steps of:

(i) identifying a required set of tables from a multiplicity of stored data tables each such set being identified from a first data table uniquely associated with one of a plurality of services;

(ii) determining from a second data table in said set of data tables a link to at least two other data tables of said data tables at least one of said at least two data tables defining a displayable item having at least two displayable elements;

(iii) determining from respective linking tables a further respective display data table for
determining from a second data table in said set of data tables a link to at least two other data tables of said data tables at displayable information page therefrom; and (v) transmitting said displayable information page to said data transport network, each request for a displayable information page causing a respective newly assembled displayable information page to be transmitted whereby updating of any of the displayable elements is immediately incorporated in one or more subsequent transmissions.

20. A database used in the method of claim 19, said database comprising:

a hierarchical arrangement of data tables, said data tables including a service table and a plurality of record tables, said service table having a plurality of service entries each of which identifies a unique service, each service being associated with a respective set of record tables each of which has a data entry identifying its respective service, and for each service at least one of the associated record tables including record entries which are linked to shared record entries in other record tables by linking entries in linking record tables.

21. A database as in claim 20 in which at least one of the record tables includes shared record entries used by more than one of the other record tables.

22. A database as in claim 20 in which at least some entries in one of the record tables have links to shared records in at least two other record tables, each link comprising a record entry in a respective linking record table.

23. A database as in claim 20 in which respective detail record entries in one of the record tables are directly linked to records in another record table which has links to a third of the record tables by entries in a linking record table.

24. A database as in claim 20 in which record entries in one of the record tables are linked to other record entries in the same record table by way of entries in a linking record table.

25. A database as in claim 20 in which at least one of the record tables includes hyperdata entries defining a location for playable files which are linked to one of the record tables through a respective linking table.

26. A database as in claim 25 in which each hyperdata record has an associated record entry in another of the record tables, said associated record entry defining the format of the playable data file.

27. A database as in claim 26 in which the playable formats include software programs whereby appropriate end-user terminals may be provided with moving images.

28. A database as in claim 26 in which the playable formats include sound whereby appropriate media players may provide a sound track to an end-user.

29. A database as in claim 26 in which the playable formats include picture files whereby a still image may be presented to an end-user.

30. A database as in claim 20 each service including a personnel record table including entries for each authorized end-user, said records defining the permitted activity of such authorized end users.

31. A database as in claim 20 each service including a customer record table identifying customers of the service who may access the service and receive a presentation assembled from a plurality of the record tables.

32. A database as in claim 20 including a mapping record table including entries defining for entries in other record tables an alphanumeric name for display in respect of each data field associated with entries in such other record tables.

33. A database used in the method of claim 19, said database comprising:

a hierarchical arrangement of data tables associated with a plurality of services, a first of said data tables comprising a service table identifying the plurality of services, each said service having a unique service identifier, the others of said data tables comprising a plurality of record tables, each of said record tables being associated uniquely with one service by inclusion of the respective unique service identifier for said service, each service being associated with a respective set of record tall us, and for each of said services at least one of said respective associated record tables including record entries which are linked to shared record entries in other record tables by linking entries in linking record tables.

34. A database as in claim 33 in which at least one of the respective record tables for said associated service includes shared record entries used by more than one of the other record tables.

35. A database as in claim 33 in which at least some entries in one of the record tables have links to shared records in at least two other record tables, each link comprising a record entry in a respective linking record table.

36. A database as in claim 33 in which respective detail record entries in one of the record tables are directly linked to records in another record table which has links to a third of the record tables by entries in a linking record table.

37. A database as in claim 33 in which record entries in one of the record tables are linked to other record entries in the same record table by way of entries in a linking record table.

38. A database as in claim 33 in which at least one of the record tables includes hyper data entry records defining a location for playable files which are linked to one of the record tables through a respective linking table.

39. A database as in claim 38 in which each hyper data entry record has an associated record entry in another of the record tables, said associated record entry defining the format of the playable data file.

40. A database as in claim 39 in which at least one identified playable format includes a software program defining moving images for use by end-user terminals.

41. A database as in claim 39 in which at least one identified playable format includes data defining sound for use by media players to provide a sound track to an end-user.

42. A database as in claim 39 in which at least one identified playable format includes data defining a picture to cause a still image to be presented to an end-user.

43. A database as in claim 33 in which each service includes a respective unique personnel record table including entries for each authorized end-user, said records defining the permitted activity of such authorized end-users.

44. A database as in claim 33 in which each service includes a respective unique customer record table identifying customers of the service who may access the service and receive a presentation assembled by a process which selects each part of the presentation by use of at least a plurality of the record tables associated with the respective unique service identifier.

45. A database as claimed in claim 33 including a mapping record table which includes entries which define an alphanumeric name for display in respect of each data field associated with entries in other record tables.

* * * * *

UNITED STATES PATENT AND TRADEMARK OFFICE
CERTIFICATE OF CORRECTION

PATENT NO.     : 6,466,941 B1
DATED          : October 15, 2002
INVENTOR(S)    : Rowe et al.

It is certified that error appears in the above-identified patent and that said Letters Patent is hereby corrected as shown below:

Column 20,
Line 13, ";" should be -- : --.
Line 22, "elenient" should be -- element --.
Line 33, "assembly" should be -- assemble --.
Line 35, "assemble" should be -- assembled --.

Column 21,
Line 1, "fist" should be -- first --.
Line 21, "end-under" should be -- end-user --.
Lines 37 and 41, "medial" should read -- media --.

Column 22,
Line 29, "fist" should be -- first --.

Column 23,
Line 54, "at" should be -- a --.

Column 24,
Line 67, "tall us" should be -- tables --.

Signed and Sealed this

Twenty-eighth Day of October, 2003

JAMES E. ROGAN
*Director of the United States Patent and Trademark Office*